(12) United States Patent
Fisher, Jr. et al.

(10) Patent No.: US 9,180,631 B2
(45) Date of Patent: Nov. 10, 2015

(54) MOLDED-IN INSERT AND METHOD FOR FIBER REINFORCED THERMOPLASTIC COMPOSITE STRUCTURE

(75) Inventors: Edward McMurray Fisher, Jr., Huntsville, AL (US); Brian Allen Carter, Huntsville, AL (US)

(73) Assignee: The Boeing Company, Chicago, IL (US)

( * ) Notice: Subject to any disclaimer, the term of this patent is extended or adjusted under 35 U.S.C. 154(b) by 714 days.

(21) Appl. No.: 13/189,478

(22) Filed: Jul. 22, 2011

(65) Prior Publication Data

US 2013/0022391 A1 Jan. 24, 2013

(51) Int. Cl.
| F16B 1/00 | (2006.01) |
| B29C 31/08 | (2006.01) |
| B29C 70/68 | (2006.01) |
| B29C 39/10 | (2006.01) |
| B29C 45/14 | (2006.01) |
| F16B 37/12 | (2006.01) |
| B29K 105/20 | (2006.01) |

(52) U.S. Cl.
CPC ............... *B29C 70/682* (2013.01); *B29C 39/10* (2013.01); *B29C 45/14311* (2013.01); *B29C 45/14631* (2013.01); *B29C 70/683* (2013.01); *F16B 37/122* (2013.01); *B29K 2105/20* (2013.01); *Y10T 403/47* (2015.01)

(58) Field of Classification Search
CPC .... B29C 39/10; B29C 70/682; B29C 70/683; B29C 43/18; B29C 70/00; B29C 44/12; B29C 49/20; B29C 45/14; B29C 45/14311; B29C 45/14008; B20C 66/71; B20C 66/74; B29K 2105/06; B29K 2105/20; F16B 7/00; F16B 37/00; F16B 23/0061; F16B 23/11; E04C 3/00; E04C 3/20; B23B 1/08; B23B 5/12
USPC .......... 428/35.3, 36.9, 35.8; 403/265; 411/82, 411/180
See application file for complete search history.

(56) References Cited

U.S. PATENT DOCUMENTS

| 2,040,674 A | 5/1936 | Severance |
| 3,362,281 A | 1/1968 | Finlay |
| 4,003,287 A | 1/1977 | Ziaylek, Jr. |
| 6,379,763 B1* | 4/2002 | Fillman ........................ 428/36.9 |
| 6,692,207 B1 | 2/2004 | Bailey |
| 2002/0050105 A1* | 5/2002 | McCorkle et al. ............ 52/127.1 |

FOREIGN PATENT DOCUMENTS

| EP | 0310278 | 4/1989 |
| EP | 1154166 | 11/2001 |
| GB | 2039660 | 8/1980 |

OTHER PUBLICATIONS

International Search Report, PCTIUS2012/042152, dated Oct. 1, 2012.

* cited by examiner

*Primary Examiner* — Yan Lan

(57) ABSTRACT

In an embodiment of the disclosure, there is provided a molded-in insert for high strength retention in a fiber reinforced thermoplastic composite structure. The insert has a cylindrical body and at least one circumferential groove formed in the cylindrical body, the groove having a substantially concave configuration, having a groove radius of 0.025 inch or greater, and having the groove radius greater than or equal to a groove depth.

20 Claims, 15 Drawing Sheets

MOLDED-IN INSERT AND METHOD FOR FIBER REINFORCED THERMOPLASTIC COMPOSITE STRUCTURE

BACKGROUND

1) Field of the Disclosure

The disclosure relates generally to inserts for use in structures, and more particularly, to molded-in inserts for use in composite structures and parts in aircraft, spacecraft, and other vehicles.

2) Description of Related Art

Inserts may be used in the assembly of composite and metal structures or parts for various transport vehicles, such as aircraft, spacecraft, rotorcraft, watercraft, automobiles, trucks, buses, or other transport vehicles. Such inserts may be used to receive mating fasteners, provide attachment points for multi-part assemblies, and provide load transfer points. Examples of such inserts may include press-fit inserts, swaged inserts, molded-in inserts, threaded inserts, or other suitable inserts or fittings.

Methods for installing inserts into composite and metal structures or parts may include, for example, mold in place methods, such as where molded-in inserts are installed during molding, or for example, more expensive post-molding methods, such as where press-fit inserts or swaged inserts are installed after molding.

Known press-fit inserts and swaged inserts may be pressed into an opening in metal structures or parts after molding without the use of special tools or fasteners. However, known press-fit inserts and swaged inserts designed for press-fit installation in metal structures or parts may not work well with fiber reinforced thermoplastic composite structures or parts due to the non-ductile nature of the fiber reinforced thermoplastic composite material. Such non-ductile fiber reinforced thermoplastic composite material may lead to over-stressing of the material around the insert if the fit is too tight or may lead to poor retention of the insert if the fit is too loose, thus resulting in an improper fit. Thus, a proper fit of such known press-fit and swaged inserts may be difficult to attain with non-ductile materials such as fiber reinforced thermoplastic composite material. Moreover, post-molding methods for installing known press-fit inserts or swaged inserts may incur increased labor and manufacturing costs, increased set-up and operating time, and increased final part cost.

Known molded-in inserts and threaded inserts may be molded into the composite or metal structure or part during molding. For example, FIG. 2A is an illustration of a front perspective view of a known molded-in insert 30 that may be molded in place in injection molded structures or parts. The molded-in insert 30 has knurled surfaces 34 with sharp knurls 36 and has a groove 38 with sharp edges 40, sharp internal corners 42, and a small width 44. Further, FIG. 2B is an illustration of a front perspective view of a known molded-in threaded insert 32 that may be molded in place in injection molded structures or parts. The molded-in threaded insert 32 has knurled surfaces 34 with sharp knurls 36, has groove 38 with sharp edges 40 and sharp internal corners 42, and small width 44, and has internal threads 46. Such known molded-in insert 30 and molded-in threaded insert 32 may use the knurled surfaces 34 and/or grooves 38 with sharp edges 40, sharp internal corners 42, and small internal radii 44 to retain such molded-in insert 30 and molded-in threaded insert 32 in place in thermoplastic composite parts.

However, such known molded-in insert 30 and molded-in threaded insert 32 may not work well with compression molded fiber reinforced thermoplastic composite structures or parts due to difficulties in filling the small radii 44 or the sharp internal corners 42 of the groove 38 during the molding process. FIG. 3 is an illustration of a cross-sectional top view of the known molded-in insert 30 showing the knurled surface 34 with sharp knurls 36 after being compression molded in place in a carbon fiber reinforced thermoplastic composite part 50 comprised of a carbon fiber reinforced thermoplastic composite material 52 having reinforcing carbon fibers 54 in a resin matrix 55. The reinforcing carbon fibers 54, in general, do not flow into or enter void areas 56 between the knurls 36, and thus, the formation of such void areas 56 of incomplete consolidation may be promoted within the carbon fiber reinforced thermoplastic composite material 52, which can undermine retention strength of the molded-in insert 30 within the carbon fiber reinforced thermoplastic composite part 50. Moreover, the reinforcing carbon fibers 54 of the carbon fiber reinforced thermoplastic composite material 52 may not flow into the small radii 44 (see FIGS. 2A, 2B) and/or sharp internal corners 42 (see FIGS. 2A, 2B) and may thus limit retention strength to the capability of the resin matrix 55 alone, which may be relatively weak.

Further, such known molded-in insert 30 and molded-in threaded insert 32 may have sharp edges 40 (see FIG. 4) which may cut reinforcing carbon fibers 54 during the molding process. FIG. 4 is an illustration of a cross-sectional side view of known molded-in insert 30 showing the groove 38 with sharp edges 40 and sharp internal corners 42 molded in place in the carbon fiber reinforced thermoplastic composite part 50 comprised of carbon fiber reinforced thermoplastic composite material 52 having reinforcing carbon fibers 54 in a resin matrix 55. The pressures on and flow of the carbon fiber reinforced thermoplastic composite material 52 during molding may cause the reinforcing carbon fibers 54 to have difficulty flowing into the sharp internal corners 42, thus creating void areas 56 of incomplete consolidation. Pressures on and flow of the carbon fiber reinforced thermoplastic composite material 52 during molding may cause the reinforcing carbon fibers 54 to be cut or severed when pressed against the sharp edges 40, such as at locations 58. Cut or severed reinforcing carbon fibers 54 may undermine retention strength of the molded-in insert 30 within the carbon fiber reinforced thermoplastic composite part 50.

FIG. 5A is an illustration of a cross-sectional side view showing void areas 56 of incomplete consolidation where reinforcing carbon fibers 54 of carbon fiber reinforced thermoplastic composite material 52 are forced to flow around a relatively sharp edge 60 of a carbon fiber reinforced thermoplastic composite part 62. FIG. 5B is an illustration of a close-up view of the circled portion 5B of FIG. 5A showing the void areas 56 of incomplete consolidation. Such void areas 56 of incomplete consolidation may undermine retention strength of molded-in inserts within the fiber reinforced thermoplastic composite parts or structures.

Accordingly, there is a need in the art for a molded-in insert and method for high strength retention in fiber reinforced thermoplastic composite parts or structures that provide advantages over known devices and methods.

SUMMARY

This need for a molded-in insert and method for high strength retention in fiber reinforced thermoplastic composite parts or structures is satisfied. As discussed in the below detailed description, embodiments of the molded-in insert or fitting and method for high strength retention in fiber reinforced thermoplastic composite parts or structures and methods may provide significant advantages over existing devices and methods.

In an embodiment of the disclosure, there is provided a molded-in insert for high strength retention in a fiber reinforced thermoplastic composite structure. The molded-in insert comprises a cylindrical body and at least one circumferential groove formed in the cylindrical body. The groove has a substantially concave configuration, has a groove radius of 0.025 inch or greater, and has a groove radius greater than or equal to a groove depth.

In another embodiment of the disclosure, there is provided a composite part with a molded-in insert. The composite part comprises a fiber reinforced thermoplastic composite structure comprised of a fiber reinforced thermoplastic composite material. The composite part further comprises a molded-in insert secured in the fiber reinforced thermoplastic composite structure. The molded-in insert comprises a cylindrical body and at least one circumferential groove formed in the cylindrical body. The groove has a substantially concave configuration, has a groove radius of 0.025 inch or greater, and has a groove radius greater than or equal to a groove depth.

In another embodiment of the disclosure, there is provided a method of retaining a molded-in insert in a fiber reinforced thermoplastic composite material and forming a high strength mechanical locking mechanism. The method comprises fixing a molded-in insert in a mold cavity. The molded-in insert comprises a cylindrical body and at least one circumferential groove formed in the cylindrical body. The groove has a substantially concave configuration, has a groove radius of 0.025 inch or greater, and has a groove radius greater than or equal to a groove depth. The method further comprises introducing a fiber reinforced thermoplastic composite material into the mold cavity and around the molded-in insert. The method further comprises enclosing the mold cavity. The method further comprises heating and compressing the fiber reinforced thermoplastic composite material in the mold cavity to consolidate the fiber reinforced thermoplastic composite material around the molded-in insert, such that reinforcing fibers from the fiber reinforced thermoplastic composite material flow into and fully fill the at least one circumferential groove in order to form a high strength mechanical locking mechanism that retains the molded-in insert in place in the fiber reinforced thermoplastic composite material and forms a consolidated fiber reinforced thermoplastic composite structure with the molded-in insert. The method further comprises cooling the consolidated fiber reinforced thermoplastic composite structure with the molded-in insert. The method further comprises removing the consolidated fiber reinforced thermoplastic composite structure with the molded-in insert from the mold cavity The features, functions, and advantages that have been discussed can be achieved independently in various embodiments of the disclosure or may be combined in yet other embodiments further details of which can be seen with reference to the following description and drawings.

BRIEF DESCRIPTION OF THE DRAWINGS

The disclosure can be better understood with reference to the following detailed description taken in conjunction with the accompanying drawings which illustrate preferred and exemplary embodiments, but which are not necessarily drawn to scale, wherein.

DETAILED DESCRIPTION

Disclosed embodiments will now be described more fully hereinafter with reference to the accompanying drawings, in which some, but not all of the disclosed embodiments are shown. Indeed, several different embodiments may be provided and should not be construed as limited to the embodiments set forth herein. Rather, these embodiments are provided so that this disclosure will be thorough and complete and will fully convey the scope of the disclosure to those skilled in the art.

Figure 1:
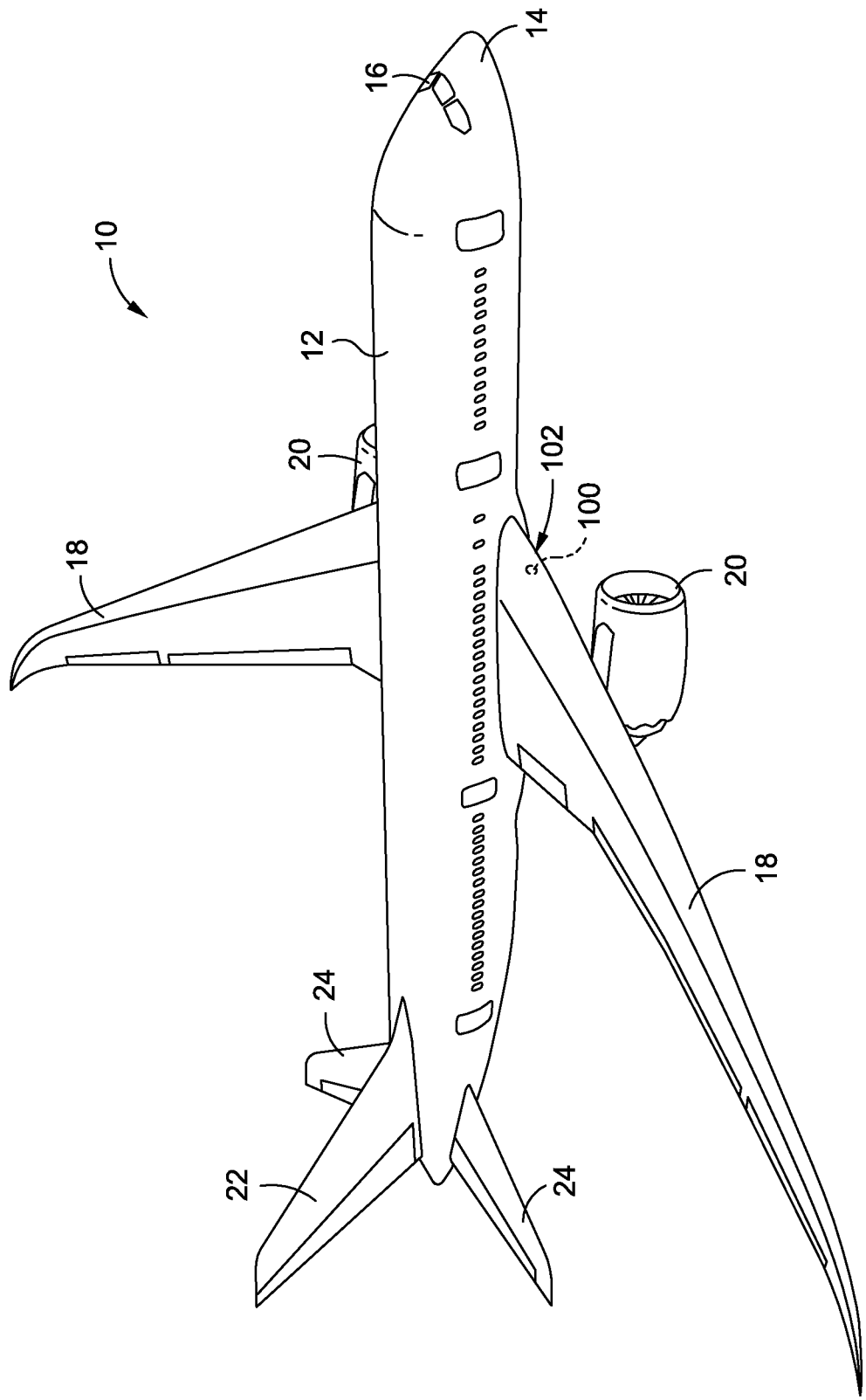
FIG. 1 is an illustration of a perspective view of an aircraft which may incorporate one or more advantageous embodiments of a molded-in insert of the disclosure.
Figure 2A:
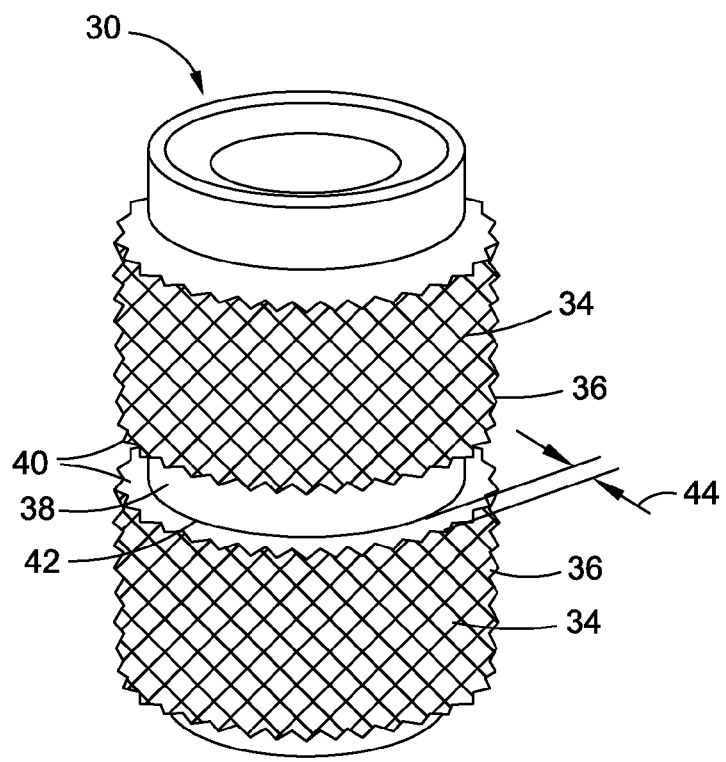
FIG. 2A is an illustration of a front perspective view of a known molded-in insert with knurled surfaces.
Figure 2B:
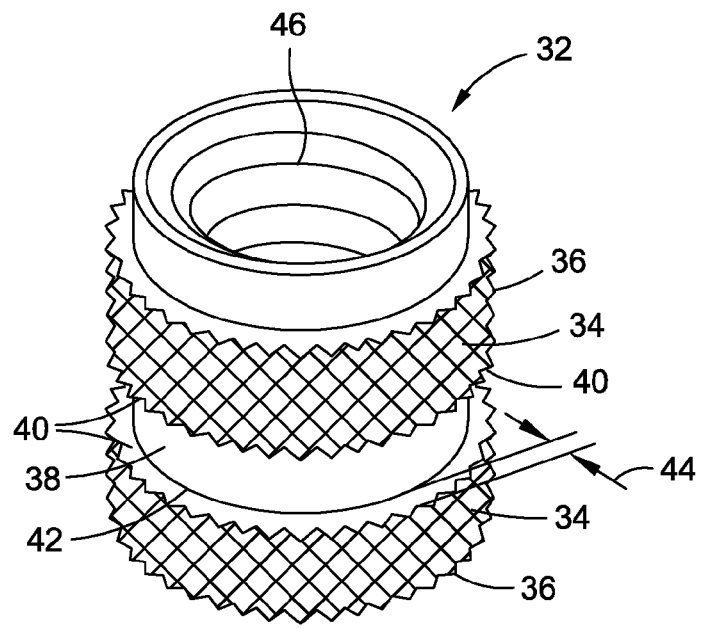
FIG. 2B is an illustration of a front perspective view of a known molded-in threaded insert with knurled surfaces.
Figure 22:
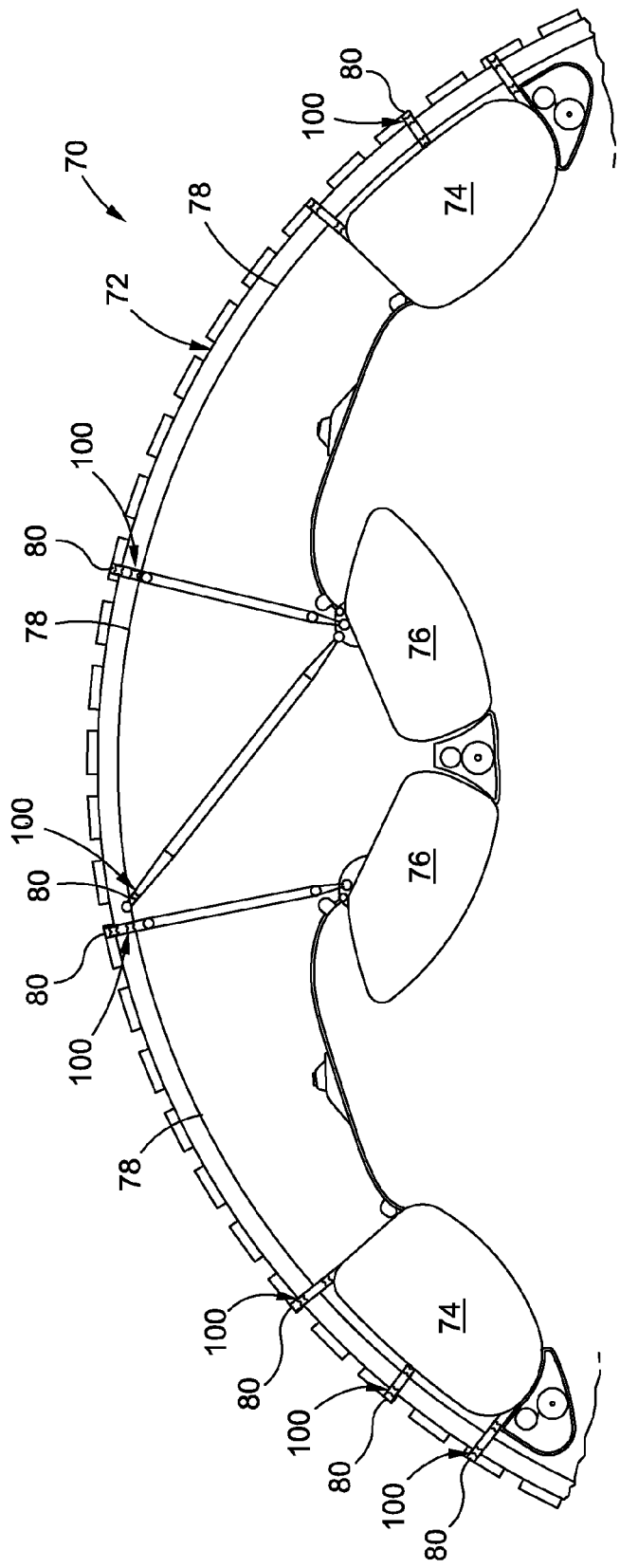

Now referring to the Figures, FIG. 1 is an illustration of a perspective view of an exemplary aircraft 10 that may be made from one or more composite parts 102 incorporating one or more advantageous embodiments of a molded-in insert 100 (or embodiments of molded-in inserts 100a-100h as shown in FIGS. 6-18B) of the disclosure. As shown in FIG. 1, the aircraft 10 comprises a fuselage 12, a nose 14, a cockpit 16, wings 18 operatively coupled to the fuselage 12, one or more propulsion units 20, a tail vertical stabilizer 22, and one or more tail horizontal stabilizers 24. The aircraft 10 may be made from composite and/or metallic materials that may be used on such portions of the aircraft 10, including but not limited to, the fuselage 12, the nose 14, the wings 18, the tail vertical stabilizer 22, and the one or more tail horizontal stabilizers 24. In addition, one or more advantageous embodiments of the molded-in insert 100 (or embodiments of molded-in inserts 100a-100h as shown in FIGS. 6-18B) of the disclosure may be used in internal secondary structures within the aircraft 10. FIG. 22 is an illustration of a cross-sectional view of an internal secondary structure 70 having a frame 72, outboard storage bins 74, center storage bins 76, interior panels 78, and fittings 80. The fittings 80 may be equipped with the molded-in inserts 100 (or embodiments of molded-in inserts 100a-100h as shown in FIGS. 6-18B) of the disclosure.

Although the aircraft 10 shown in FIG. 1 is generally representative of a commercial passenger aircraft, the molded-in insert 100 as disclosed herein, may also be employed in other types of aircraft. More specifically, the teachings of the disclosed embodiments may be applied to other passenger aircraft, cargo aircraft, military aircraft, rotorcraft, and other types of aircraft or aerial vehicles, as well as aerospace vehicles, satellites, space launch vehicles, rockets, and other aerospace vehicles. It may also be appreciated that embodiments of devices, methods, and systems in accordance with the disclosure may be utilized in other transport vehicles, such as boats and other watercraft, trains, automobiles, trucks, buses, or other suitable transport vehicles. It may further be appreciated that embodiments of devices, methods, and systems in accordance with the disclosure may be used in various structures assembled from separate links or pieces, such as scaffolding, fabric shelters, truss structures, bridges, or other suitable architectural structures. If the structural fittings and/or links are made from a composite material, one or more advantageous embodiments of the molded-in insert 100 (or embodiments of molded-in inserts 100a-100h as shown in FIGS. 6-18B) of the disclosure may be used in such structural fittings and/or links where the structure is pinned or connected together.

Figure 6:
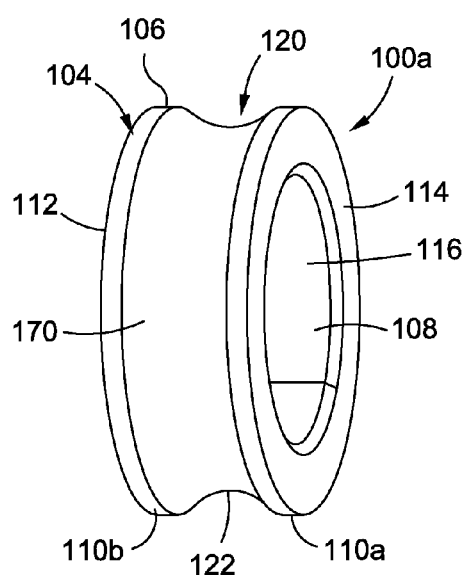
FIG. 6 is an illustration of a front perspective view of one of the embodiments of a molded-in insert of the disclosure having an exterior circumferential groove.

In one embodiment of the disclosure, there is provided a molded-in insert 100 for high strength retention in a fiber reinforced thermoplastic composite structure 130 (see FIG. 10), which may be used in a composite part 102 (see FIG. 1). FIGS. 6-19 show various embodiments of the molded-in insert 100, 100a-100h. FIG. 6 is an illustration of a front perspective view of one of the embodiments of a molded-in insert 100a. As shown in FIG. 6, the molded-in insert 100a comprises a cylindrical body 104. The cylindrical body 104 has an exterior surface 106, an interior surface 108, a first end 112, and a second end 114. The cylindrical body 104 further comprises a first circumferential substantially flat surface 110a at the second end 114 and a second circumferential substantially flat surface 110b at the first end 112. The molded-in insert 100a further comprises a central opening 116 for receiving a fastener element 154 (see FIG. 13A), such as a structural pin 156 (see FIG. 13A).

As shown in FIG. 6, the molded-in insert 100a further comprises at least one circumferential groove 120 formed in the cylindrical body 104. The circumferential groove 120 preferably has a substantially concave configuration 122 and is preferably shallow in depth. As shown in FIG. 6, the molded-in insert 100a has a single circumferential groove 120 formed in the exterior surface 106 of the cylindrical body 104, and the molded-in insert 100a has an unflanged design. However, the molded-in insert 100a or other embodiments of the molded-in insert may have a flanged design as well (see FIG. 7). The circumferential groove 120 may be formed in the exterior surface 106 of the cylindrical body 104 and/or in the interior surface 108 of the cylindrical body 104 (see FIG. 14) by a known machining process. The circumferential groove 120 may have a surface 170 that may be treated with a surface preparation treatment, discussed below, to promote bonding of a fiber reinforced thermoplastic composite material 132

Figure 9:
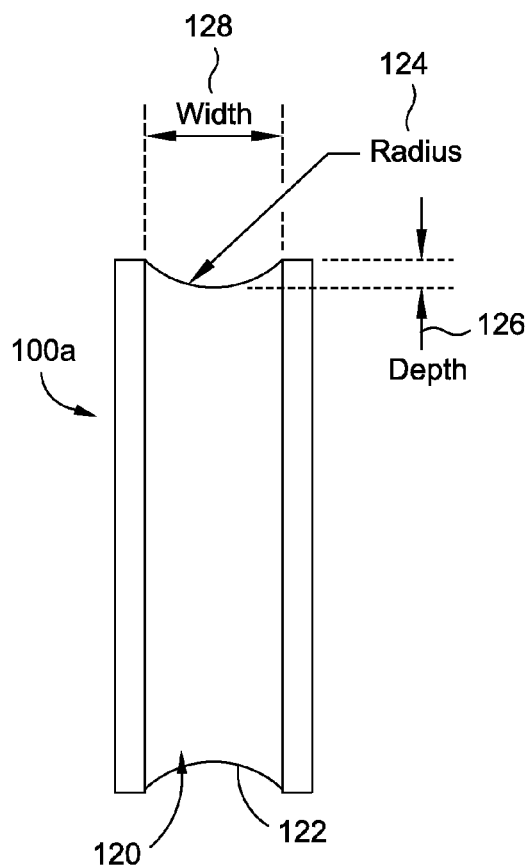
FIG. 9 is an illustration of a front view of one of the embodiments of a molded-in insert of the disclosure showing groove parameters.

(see FIG. 11) to the surface 170 of the at least one circumferential groove 120. FIG. 9 is an illustration of a front view of the molded-in insert 100a showing various parameters of the circumferential groove 120. As shown in FIG. 9, the circumferential groove 120 has a groove radius 124, a groove depth 126, and a groove width 128. Preferably, the groove radius 124 has a length measurement of 0.025 inch or greater and preferably, the groove radius 124 is constant or near constant. Preferably, the groove radius 124 is greater in length than or equal to the groove depth 126. Preferably, the groove width 128 is greater in length than the groove depth 126.

The molded-in insert 100, 100a-100h (see FIGS. 6-19) is preferably made of a machinable material. The machinable material may comprise a metal material such as aluminum, steel, titanium, brass, bronze, or another suitable metal material. The machinable material may further comprise a ceramic material, such as alumina, beryllium oxide, silicon carbide, silicon nitride, or another suitable ceramic material. The machinable material may further comprise a composite material such as filled or unfilled epoxy, phenolic, thermoplastic, urethane, polycarbonate, or another suitable composite material.

Figure 7:
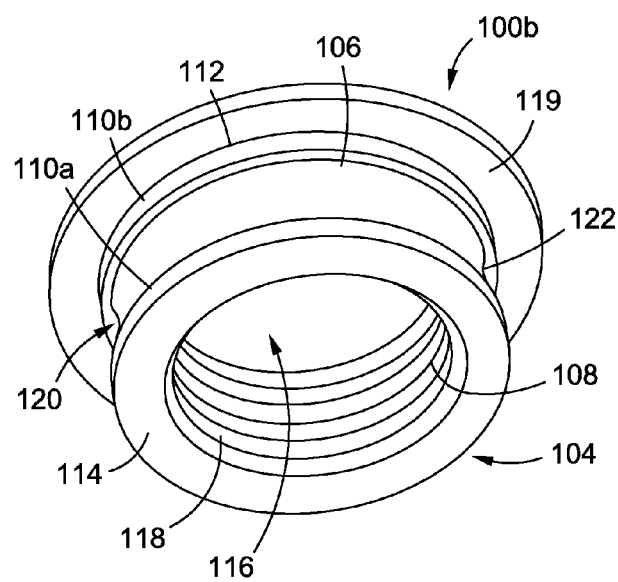
FIG. 7 is an illustration of a bottom perspective view of another one of the embodiments of a molded-in insert of the disclosure having internal threads and an exterior circumferential groove.

FIG. 7 is an illustration of a bottom perspective view of another one of the embodiments of a molded-in insert 100b of the disclosure having internal threads 118 formed in the interior surface 108 of the cylindrical body 104 and having a flange 119 extending from first end 112. The molded-in insert 100b comprises the cylindrical body 104 having the exterior surface 106, the interior surface 108, the first end 112, the second end 114, the first and second circumferential substantially flat surfaces 110a, 110b, and the central opening 116. The molded-in insert 100b further comprises a single circumferential groove 120 having the substantially concave configuration 122 and being shallow in depth. As shown in FIG. 7, the circumferential groove 120 is formed in the exterior surface 106 of the cylindrical body 104.

Figure 8:
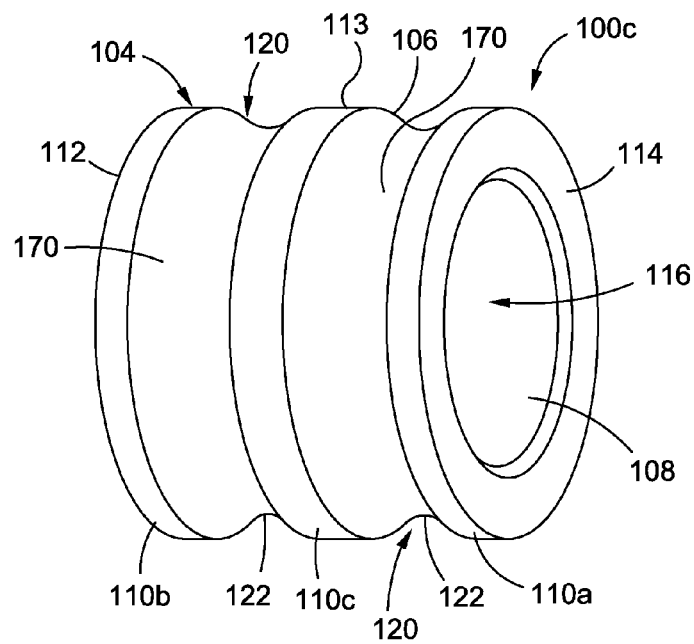
FIG. 8 is an illustration of a front perspective view of yet another one of the embodiments of a molded-in insert of the disclosure having two exterior circumferential grooves.

FIG. 8 is an illustration of a front perspective view of yet another one of the embodiments of a molded-in insert 100c of the disclosure having two circumferential grooves 120 formed in the exterior surface 106 of the cylindrical body 104. As shown in FIG. 8, the molded-in insert 100c comprises the cylindrical body 104 having the exterior surface 106, the interior surface 108, the first end 112, the second end 114, first and second circumferential substantially flat surfaces 110a, 110b, and the central opening 116. In this embodiment, the molded-in insert 100c further comprises a third circumferential substantially flat surface 110c on a central portion 113 of the cylindrical body 104. The molded-in insert 100c further comprises two circumferential grooves 120 each having substantially concave configurations 122 that are formed in the exterior surface 106 of the cylindrical body 104. The two circumferential grooves 120 are preferably shallow in depth. The circumferential groove 120 may have a surface 170 that may be treated with a surface preparation treatment, discussed below, to promote bonding of a fiber reinforced thermoplastic composite material 132 (see FIG. 11) to the surface 170 of the at least one circumferential groove 120. The molded-in insert 100c has an unflanged design. However, the molded-in insert 100c or other embodiments of the molded-in insert may have a flanged design as well (see FIG. 7).

Figure 14:
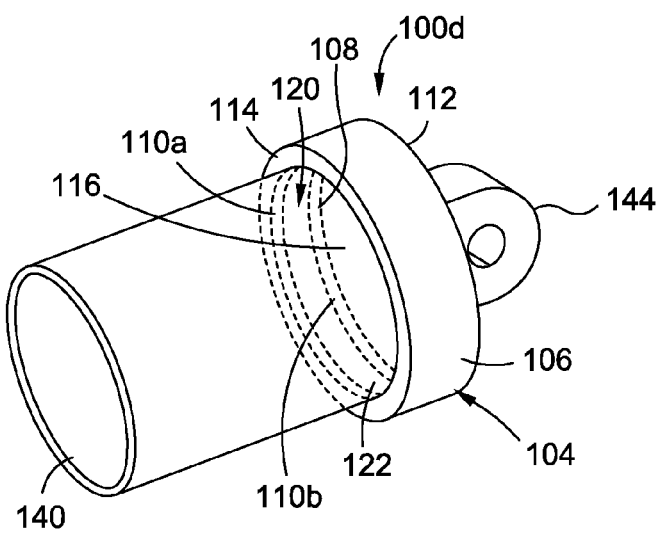
FIG. 14 is an illustration of a bottom perspective view of yet another one of the embodiments of a molded-in insert of the disclosure having an interior circumferential groove and molded in place with a cylindrical fiber reinforced thermoplastic composite structure.

FIG. 14 is an illustration of a bottom perspective view of another one of the embodiments of a molded-in insert 100d of the disclosure having a circumferential groove 120 formed in the interior surface 108 of the cylindrical body 104. FIG. 14 shows the molded-in insert 100d molded in place with a cylindrical fiber reinforced thermoplastic composite structure 140. As shown in FIG. 14, the molded-in insert 100d comprises the cylindrical body 104 having the exterior surface 106, the interior surface 108, the first end 112, the second end 114, first and second circumferential substantially flat surfaces 110a, 110b, and the central opening 116. In this embodiment, the exterior surface 106 is smooth and the molded-in insert 100d comprises a circumferential groove 120 having a substantially concave configuration 122 formed in the interior surface 108 of the cylindrical body 104. Further, in this embodiment, the molded-in insert 100d has a protruding element 144 extending from the first end 112 of the cylindrical body 104. The molded-in insert 100d has an unflanged design. However, the molded-in insert 100d or other embodiments of the molded-in insert may have a flanged design as well (see FIG. 7).

Figure 15A:
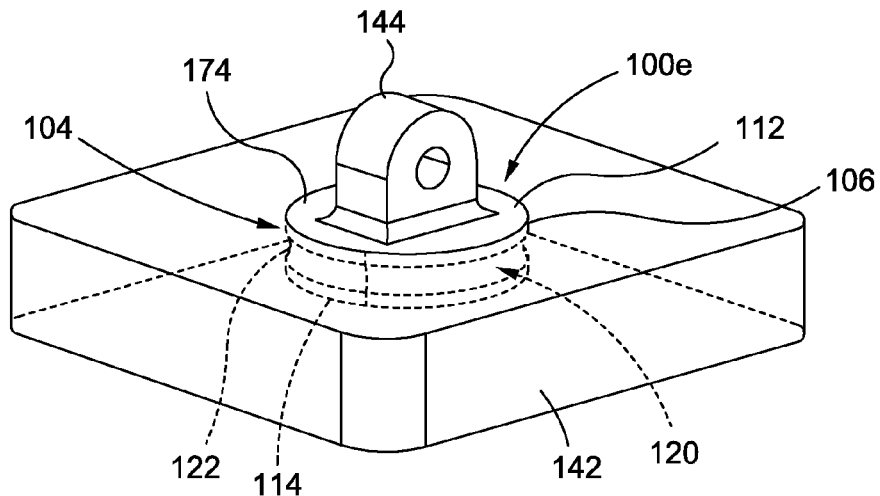
FIG. 15A is an illustration of a front perspective view of yet another one of the embodiments of a molded-in insert of the disclosure having an exterior circumferential groove and molded in place in a block-shaped fiber reinforced thermoplastic composite structure.
Figure 15B:
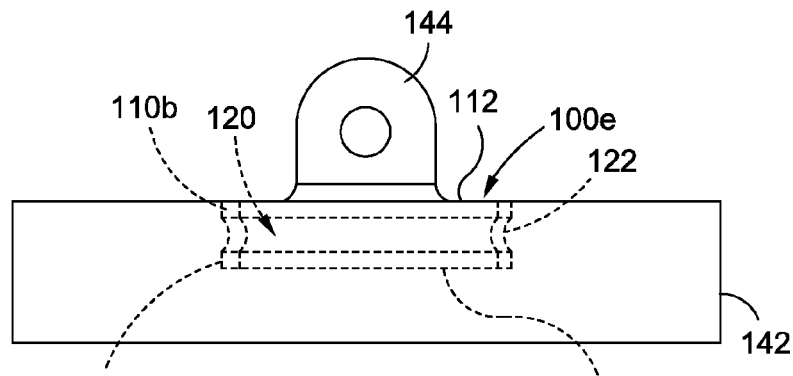
FIG. 15B is an illustration of a side view of the molded-in insert molded in place in the block-shaped fiber reinforced thermoplastic composite structure of FIG. 15A.

FIG. 15A is an illustration of a front perspective view of another one of the embodiments of a molded-in insert 100e of the disclosure having a circumferential groove 120 formed in the exterior surface 106 of the cylindrical body 104 and molded in place in a block-shaped fiber reinforced thermoplastic composite structure 142. FIG. 15B is an illustration of a side view of the molded-in insert 100e molded in place in the block-shaped fiber reinforced thermoplastic composite structure 142 of FIG. 15A. As shown in FIGS. 15A-15B, the molded-in insert 100e comprises the cylindrical body 104 having the exterior surface 106, the interior surface 108 (not shown), the first end 112, the second end 114, first and second circumferential substantially flat surfaces 110a, 110b, and the central opening 116 (not shown). In this embodiment, the molded-in insert 100e comprises a circumferential groove 120 having a substantially concave configuration 122 formed in the exterior surface 106 of the cylindrical body 104. Further, in this embodiment, the molded-in insert 100e has a protruding element 146 extending from the first end 112 of the cylindrical body 104. The molded-in insert 100e has an unflanged design. However, the molded-in insert 100e or other embodiments of the molded-in insert may have a flanged design as well (see FIG. 7).

Figure 16A:
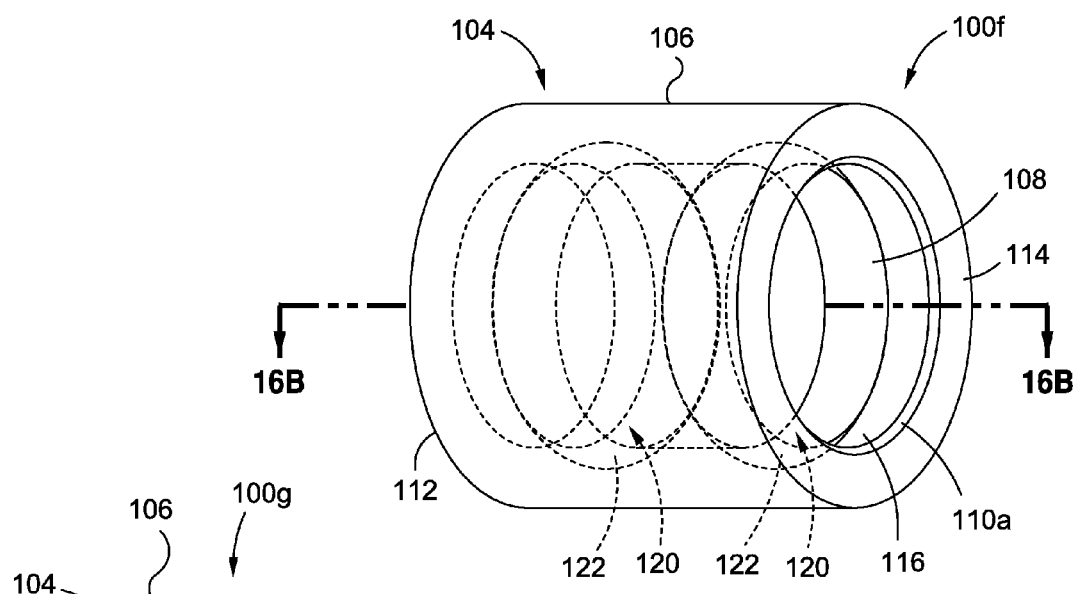
FIG. 16A is an illustration of a front perspective view of yet another one of the embodiments of a molded-in insert of the disclosure having two interior circumferential grooves.
Figure 16B:
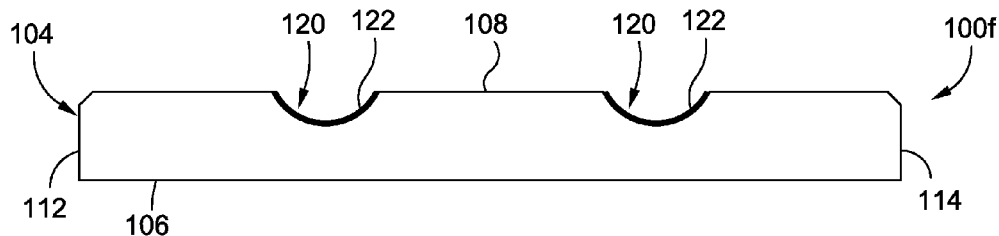
FIG. 16B is an illustration of a cross-sectional view taken along lines 16B-16B of FIG. 16A.

FIG. 16A is an illustration of a front perspective view of another one of the embodiments of a molded-in insert 100f of the disclosure having two circumferential grooves 120 formed in the interior surface 108 of the cylindrical body 104. FIG. 16B is an illustration of a cross-sectional view taken along lines 16B-16B of FIG. 16A. As shown in FIGS. 16A-16B, the molded-in insert 100f comprises the cylindrical body 104 having the exterior surface 106, the interior surface 108, the first end 112, the second end 114, the first circumferential substantially flat surface 110a, and the central opening 116. In this embodiment, the molded-in insert 100f further comprises two circumferential grooves 120 each having substantially concave configurations 122 that are formed in the interior surface 108 of the cylindrical body 104. The molded-in insert 100f has an unflanged design. However, the molded-in insert 100f or other embodiments of the molded-in insert may have a flanged design as well (see FIG. 7).

Figure 17:
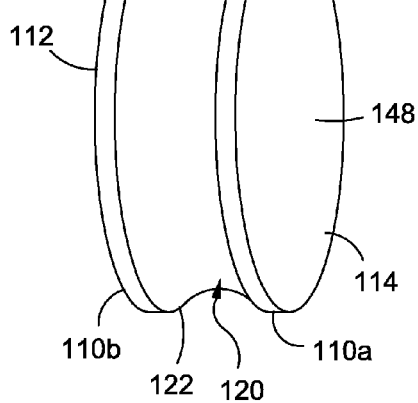
FIG. 17 is an illustration of a front perspective view of yet another one of the embodiments of a molded-in insert of the disclosure having an exterior circumferential groove where the molded-in insert is solid with no central opening.

FIG. 17 is an illustration of a front perspective view of another one of the embodiments of a molded-in insert 100g of the disclosure where the molded-in insert 100g has a solid interior 148 with no central opening 116. The molded-in insert 100g comprises the cylindrical body 104 having the exterior surface 106, the first end 112, the second end 114, and the first and second circumferential substantially flat surfaces 110a, 110b. This embodiment has a solid interior 148 with no central opening 116. The molded-in insert 100g further comprises the circumferential groove 120 having the substantially concave configuration 122 that is formed in the exterior surface 106 of the cylindrical body 104. The molded-in insert 100g has an unflanged design. However, the molded-in insert 100g or other embodiments of the molded-in insert may have a flanged design as well (see FIG. 7).

Figure 18A:
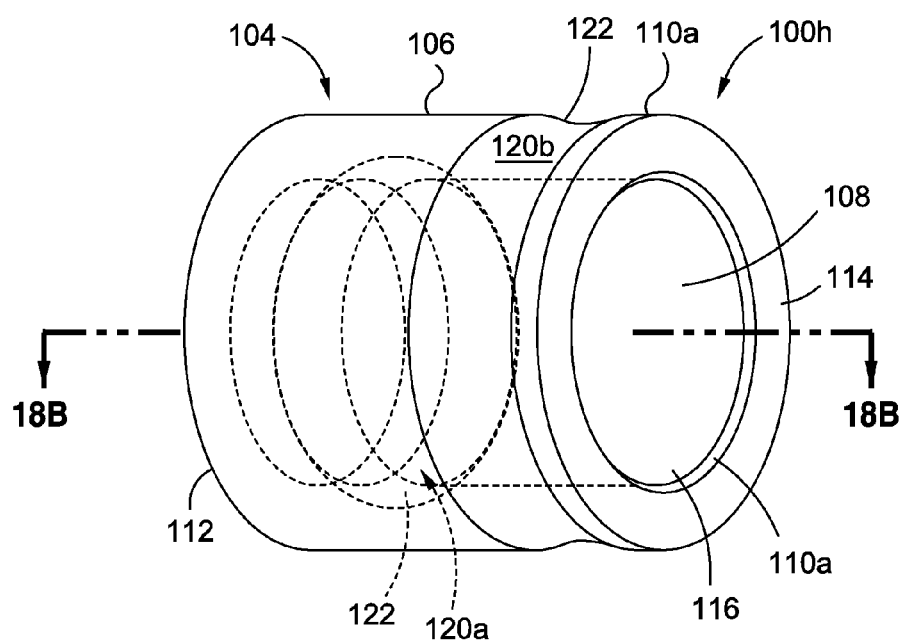
FIG. 18A is an illustration of a front perspective view of yet another one of the embodiments of a molded-in insert of the disclosure having an interior circumferential groove and an exterior circumferential groove.
Figure 18B:
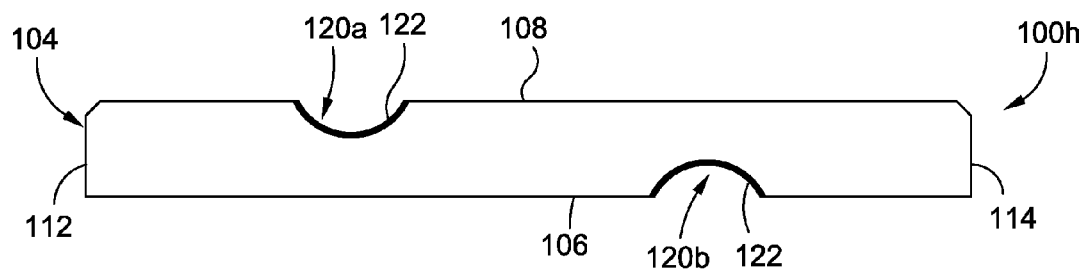
FIG. 18B is an illustration of a cross-sectional view taken along lines 18B-18B of FIG. 18A.

FIG. 18A is an illustration of a front perspective view of another one of the embodiments of a molded-in insert 100h of the disclosure having a first circumferential groove 120a formed in the interior surface 108 of the cylindrical body 104 and having a second circumferential groove 120b formed in the exterior surface 106 of the cylindrical body 104. FIG. 18B is an illustration of a cross-sectional view taken along lines 18B-18B of FIG. 18A. As shown in FIGS. 18A-18B, the molded-in insert 100h comprises the cylindrical body 104 having the exterior surface 106, the interior surface 108, the first end 112, the second end 114, the first circumferential substantially flat surface 110a, and the central opening 116. In this embodiment, the molded-in insert 100h further comprises first and second circumferential grooves 120a, 120b each having substantially concave configurations 122, where the first circumferential groove 120a is formed in the interior surface 108 of the cylindrical body 104, and the second circumferential groove 120b is formed in the exterior surface 108 of the cylindrical body 104. The molded-in insert 100h has an unflanged design. However, the molded-in insert 100h or other embodiments of the molded-in insert may have a flanged design as well (see FIG. 7).

Embodiments of the molded-in inserts 100, 100a-100h disclosed herein but are not limited to these exemplary embodiments. Embodiments of the molded-in inserts 100, 100a-100h may also have more than two circumferential grooves 120 that may be formed in the exterior surface 106 of the cylindrical body 104, that may be formed in the interior surface 108 of the cylindrical body 104, or that may be formed in both the exterior surface 106 and the interior surface 108 of the cylindrical body 104.

Figure 10:
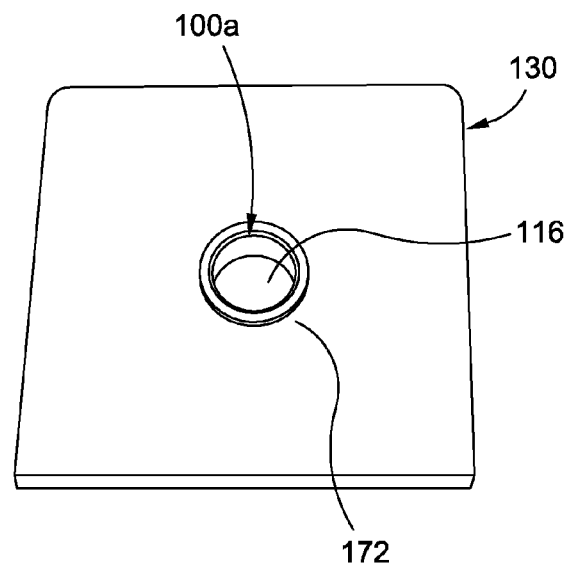
FIG. 10 is an illustration of a top perspective view of one of the embodiments of a molded-in insert of the disclosure having an exterior circumferential groove and molded in place in a fiber reinforced thermoplastic composite structure.

FIG. 10 is an illustration of a top perspective view of one of the embodiments of the molded-in insert 100a having central opening 116. The molded-in insert 100a, as shown in FIG. 10, is molded in place in a fiber reinforced thermoplastic composite structure 130.

Figure 11:
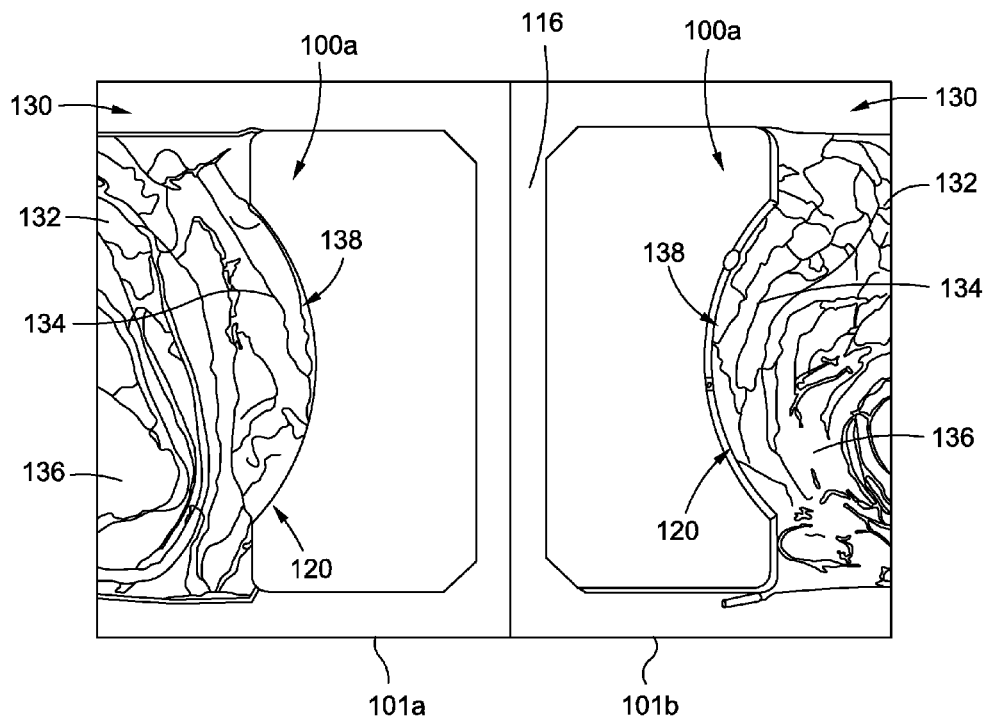
FIG. 11 is an illustration of a cross-sectional top view of the molded-in insert of FIG. 6 molded in place in a fiber reinforced thermoplastic composite structure and showing full filling of an exterior circumferential groove with reinforcing fibers from fiber reinforced thermoplastic composite material.

FIG. 11 is an illustration of a cross-sectional top view of a first half 101a and a second half 101b of the molded-in insert 100a of FIG. 6 which is molded in place in the fiber reinforced thermoplastic composite structure 130. The central opening 116 between the first half 101a and the second half 101b of the molded-in insert 100a is shown in FIG. 11 as smaller than its actual size, and the first half 101a and the second half 101b are shown closer together in order to show the reinforcing fibers 134 fully or completely filling the circumferential groove 120 in the first half 101a and in the second half 101b of the molded-in insert 100a. FIG. 11 shows the fiber reinforced thermoplastic composite structure 130 which comprises fiber reinforced thermoplastic composite material 132 having reinforcing fibers 134 in a resin matrix 136. The reinforcing fibers 134 may be made of a material comprising graphite, glass, carbon, boron, ceramics, aramids, polyolefins, polyethylenes, polymers, or other suitable materials. The resin matrix 136 may be made of a resin material comprising thermoplastic resins such as polyamides, polyolefins and fluoropolymers; thermosetting resins such as epoxies and polyesters; hybrid polymer resins with properties of both thermosetting resins and thermoplastic resins; or other suitable resin materials. Preferably, when the molded-in insert 100a (or the molded-in inserts 100, 100b-100h) is molded in the fiber reinforced thermoplastic composite structure 130, the reinforcing fibers 134 from the fiber reinforced thermoplastic composite material 132 flow into and fully or completely fill the circumferential groove 120 and form a high strength mechanical locking mechanism 138 that secures the molded-in insert 100a in place in the fiber reinforced thermoplastic composite structure 130. The molded-in insert 100a (or the molded-in inserts 100, 100b-100h) may be molded in the fiber reinforced thermoplastic composite structure 130 via a molding process comprising compression molding, resin transfer molding, injection molding, blow molding, transfer molding, reaction injection molding, casting, investment casting, or another suitable molding process.

Figure 12:
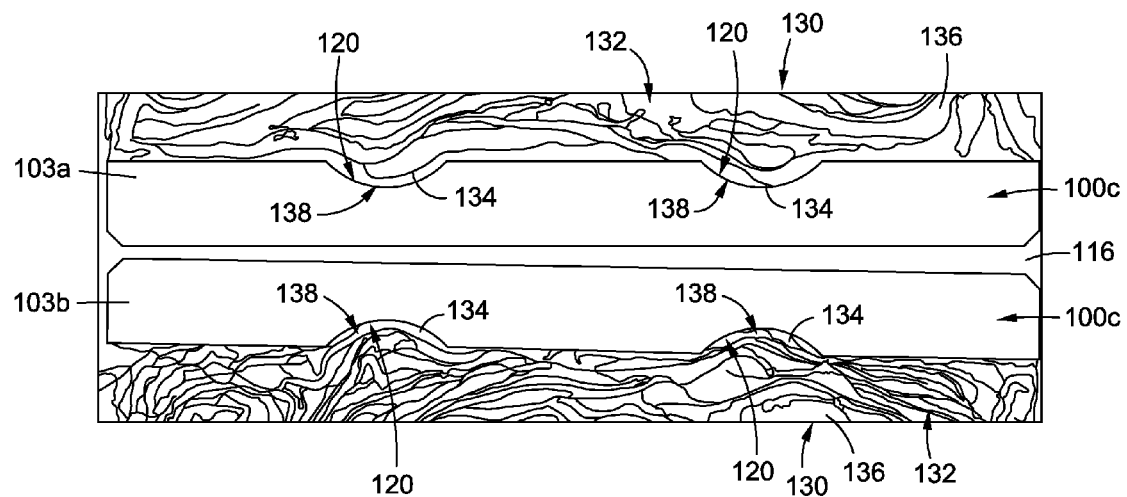
FIG. 12 is an illustration of a cross-sectional top view of the molded-in insert of FIG. 8 molded in place in a fiber reinforced thermoplastic composite structure and showing full filling of two exterior circumferential grooves with reinforcing fibers from fiber reinforced thermoplastic composite material.

FIG. 12 is an illustration of a cross-sectional top view of the molded-in insert 100c of FIG. 8 which is molded in place in a fiber reinforced thermoplastic composite structure 130 and which shows full filling of two exterior circumferential grooves 120 with reinforcing fibers 134 from fiber reinforced thermoplastic composite material 132. FIG. 12 shows a cross-sectional top view of a first half 103a and a second half 103b of the molded-in insert 100c of FIG. 8 where the molded-in insert 100c is molded in place in the fiber reinforced thermoplastic composite structure 130. The central opening 116 between the first half 103a and the second half 103b of the molded-in insert 100c is shown in FIG. 12 as smaller than its actual size, and the first half 103a and the second half 103b are shown closer together in order to show the reinforcing fibers 134 fully or completely filling the circumferential grooves 120 in both the first half 103a and the second half 103b of the molded-in insert 100c. FIG. 12 shows the fiber reinforced thermoplastic composite structure 130 which preferably comprises fiber reinforced thermoplastic composite material 132 having reinforcing fibers 134 in a resin matrix 136. Preferably, when the molded-in insert 100c is molded in the fiber reinforced thermoplastic composite structure 130, the reinforcing fibers 134 from the fiber reinforced thermoplastic composite material 132 flow into and fully or completely fill the circumferential grooves 120 and form a high strength mechanical locking mechanism 138 that secures the molded-in insert 100c in place in the fiber reinforced thermoplastic composite structure 130. The molded-in insert 100c may be molded in the fiber reinforced thermoplastic composite structure 130 via a molding process comprising compression molding, resin transfer molding, injection molding, blow molding, transfer molding, reaction injection molding, casting, investment casting, or another suitable molding process.

Figure 21A:
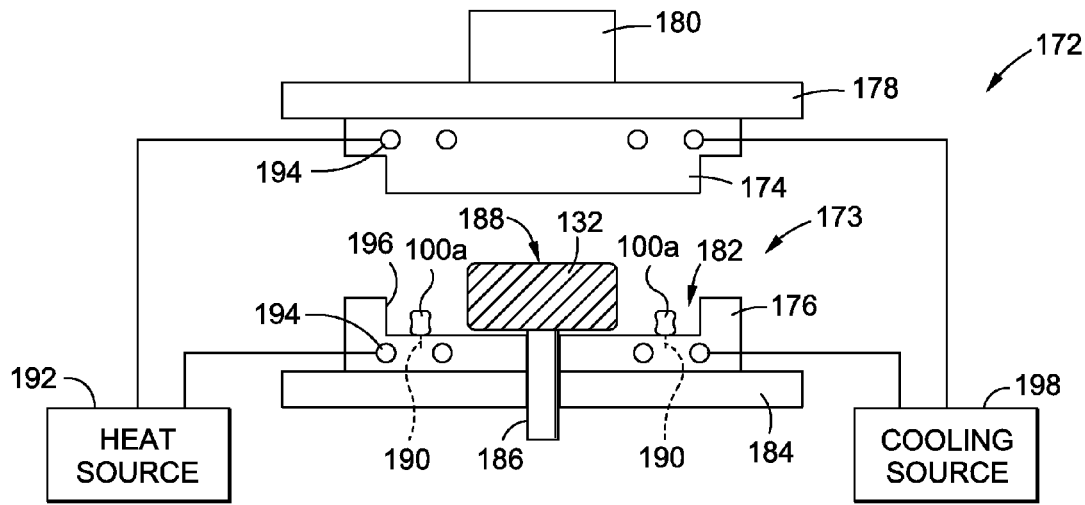
FIG. 21A is a schematic illustration of a front view of split mold apparatus in an open position having a fiber reinforced thermoplastic composite material and one of the embodiments of molded-in inserts of the disclosure prior to undergoing compression molding.
Figure 21B:
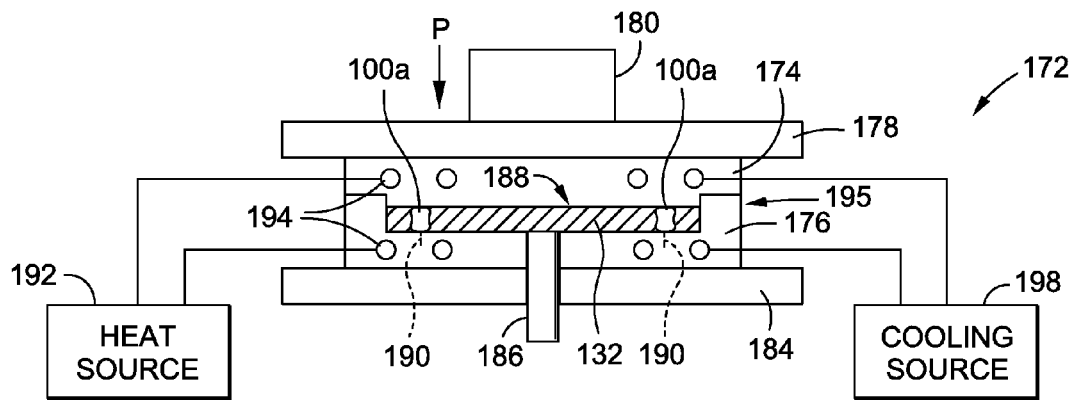
FIG. 21B is a schematic illustration of a front view of the split mold apparatus of FIG. 21A in a closed position where the fiber reinforced thermoplastic composite material and molded-in inserts are compressed and consolidated during compression molding.
Figure 21C:
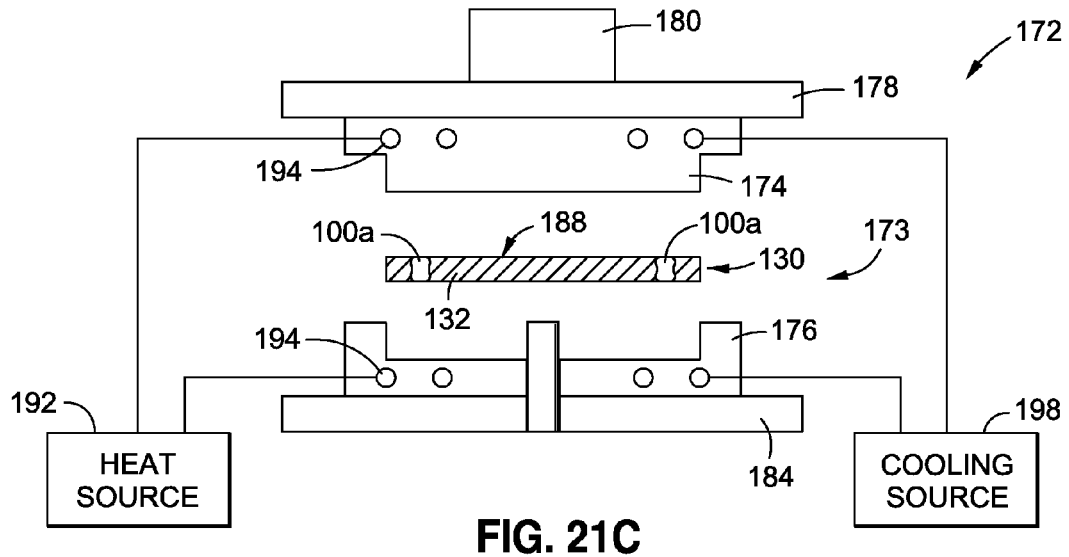
FIG. 21C is a schematic illustration of a front view of the split mold apparatus of FIG. 21A in an open position showing a consolidated fiber reinforced thermoplastic composite structure with molded-in inserts after compression molding; and, FIG. 22 is an illustration of a cross-sectional view of an internal secondary structure of an aircraft which may incorporate one or more advantageous embodiments of a molded-in insert of the disclosure.

Preferably, the molded-in inserts 100, 100a-100h disclosed herein are molded in the fiber reinforced thermoplastic composite structure 130 via compression molding. Compression molding is particularly suitable for molding large composite structures and parts, such as large flat or curved fiber reinforced thermoplastic composite structures and parts, for example, wings 18 and fuselage 12 of aircraft 10 (see FIG. 1). FIGS. 21A-21C show an exemplary split mold apparatus 172 that may be used in a compression molding process for molding the molded-in inserts 100 or 100a-100h disclosed herein in the fiber reinforced thermoplastic composite structure 130.

FIG. 21A is a schematic illustration of a front view of the split mold apparatus 172 holding a fiber reinforced thermoplastic composite material 132 and one of the embodiments of molded-in inserts 100a of the disclosure prior to undergoing compression molding. FIG. 21A shows the split mold apparatus 172 in an open position 173. As shown in FIG. 21A, the split mold apparatus 172 preferably comprises a male portion 174 and a female portion 176. The male portion 174 may be attached to an upper platen 178 which, in turn, may be attached to a hydraulic ram element 180. The hydraulic ram element 180 moves the male portion 174 with respect to the female portion 176. The female portion 176 preferably has a mold cavity 182, and the female portion 176 may be attached to a lower platen 184. An ejector pin 186 may be positioned through the lower platen 184 and through the female portion 176 and is preferably in contact with a molding material 188. The molding material 188 may comprise the fiber reinforced thermoplastic composite material 132 disclosed herein or another suitable molding material, and the molding material 188 may be introduced or placed into the mold cavity 182. The molding material 188 may be in the form of chopped pre-impregnated tape, dry, unmelted pellets, pre-formed sheets, viscous masses, or another suitable form.

As shown in FIG. 21A, one or more molded-in inserts 100a (see FIG. 6) (or molded-in inserts 100 or 100b-100h disclosed herein) may be loaded into the mold cavity 182 and trapped by features machined into the molded-in insert itself or fixed or held in place mechanically with one or more pins 190 for non-threaded molded-in inserts. Alternatively, for threaded molded-in inserts (see FIG. 7), the molded-in insert may be fixed or held in place with a suitable fastener device (not shown). The mold cavity 182 and female portion 176 may be preheated prior to the molding material 188 being placed into the mold cavity 182. Alternatively, the mold cavity 182 and the molding material 188 may be heated once the molding material 188 is placed into the mold cavity 182. Similarly, the male portion 174 may be preheated prior to the molding material 188 being placed into the mold cavity 182. Alternatively, the male portion 174 may be heated once the molding material 188 is placed into the mold cavity 182. Finally, the molding material 188 may be preheated prior to being placed into the mold cavity 182 and then further heated while in the mold cavity 182. Alternatively, the molding material 188 may be heated while in the mold cavity 182. The mold cavity 182, the female portion 176, and the male portion 174 may be preheated or heated with heat from a heat source 192 connected to heating/cooling channels 194 formed in the mold cavity 182, female portion 176, and male portion 174. After the mold material 188 is effectively heated to a pliable state in the mold cavity 182, the split mold apparatus 172 is preferably closed.

FIG. 21B is a schematic illustration of a front view of the split mold apparatus 172 of FIG. 21A where the fiber reinforced thermoplastic composite material 132 and molded-in inserts 100a are compressed and consolidated during the compression molding process. FIG. 21B shows the split mold apparatus 172 in a closed position 195. During compression molding process, the hydraulic ram element 180 lowers the male portion 174 of the split mold apparatus 172 onto the female portion 176 and closes the split mold apparatus 172 so as to enclose the mold cavity 182. The hydraulic ram element 180 and the male portion 174 apply an effective pressure to the molding material 188 within the mold cavity 182 in order to compress and force the molding material 188, such as the fiber reinforced thermoplastic composite material 132, into contact with all or substantially all internal mold areas 196 (see FIG. 21A) within the mold cavity 182 in order to fill the mold cavity 182. During the compression molding process, the resin matrix 136 of the fiber reinforced thermoplastic composite material 132 preferably encapsulates the one or more molded-in inserts 100a (or molded-in inserts 100 or 100b-100h disclosed herein) in order to consolidate the fiber reinforced thermoplastic composite material 132 around the one or more molded-in inserts 100a (or molded-in inserts 100 or 100b-100h disclosed herein) to form the fiber reinforced thermoplastic composite structure 130 with one or more molded-in inserts 100a (or molded-in inserts 100 or 100b-100h disclosed herein). In FIG. 21B, the molding material 188, such as the fiber reinforced thermoplastic composite material 132, is shown as having flowed throughout the mold cavity 182 to form the fiber reinforced thermoplastic composite structure 130 with one or more molded-in inserts 100a (or 100 or 100b-100h).

When the one or more molded-in inserts 100a (or molded-in inserts 100 or 100b-100h disclosed herein) are molded in the fiber reinforced thermoplastic composite structure 130, the reinforcing fibers 134 from the fiber reinforced thermoplastic composite material 132 flow into and fully or completely fill the circumferential grooves 120 and form a high strength mechanical locking mechanism 138 (see FIG. 11) that retains or secures the one or more molded-in inserts 100a (or molded-in inserts 100 or 100b-100h disclosed herein) in place in the fiber reinforced thermoplastic composite material 132 to form the consolidated or molded fiber reinforced thermoplastic composite structure 130 with the one or more molded-in inserts 100a (or molded-in inserts 100 or 100b-100h disclosed herein). The molding material 188 may be heated during molding, and heat and pressure may be applied for an effective period of time. For thermoplastic molding material, effective heat and pressure are applied for a period of time of only as long as it takes for the thermoplastic molding material to fill the mold cavity 182. For thermoset plastic molding material, effective heat and pressure may be applied for a period of time until the thermoset plastic molding material cures. Preferably, the pressure used during such compression molding process, as disclosed herein, may be in a range of from about 1000 psi (pounds per square inch) to about 5000 psi, and more preferably, in a range of from about 4000 psi to about 5000 psi. Preferably, the temperature used during such compression molding process, as disclosed herein, may be in a range of from about 600 degrees Fahrenheit to about 700 degrees Fahrenheit for thermoplastic molding materials. After the molding material 188 cures, the encapsulated or consolidated one or more molded-in inserts 100a (or molded-in inserts 100 or 100b-100h disclosed herein) within the fiber reinforced thermoplastic composite structure 130, as well as the mold cavity 182, female portion 176, and male portion 174, may be cooled down on their own via forced convection, or alternatively, may be cooled down with any suitable active cooling process such as from a cooling source 198 which may be connected to heating/cooling channels 194 formed in the mold cavity 182. Preferably, after the consolidated fiber reinforced thermoplastic composite structure 130 with the one or more molded-in inserts 100a (or molded-in inserts 100 or 100b-100h disclosed herein) has sufficiently cooled for an effective period of time, the consolidated fiber reinforced thermoplastic composite structure 130 with the one or more molded-in inserts 100a (or molded-in inserts 100 or 100b-100h disclosed herein) is removed from the mold cavity 182. The split mold apparatus 172 may be opened by using the hydraulic ram element 180 to raise the male portion 174 of the split mold apparatus 172 away from the female portion 176.

FIG. 21C is a schematic illustration of a front view of the split mold apparatus 172 of FIG. 21A showing the consolidated fiber reinforced thermoplastic composite structure 130 and molded-in inserts 100a after the compression molding process. FIG. 21C shows the split mold apparatus 172 in the open position 173 and the molded or consolidated fiber reinforced thermoplastic composite structure 130 with the one or more molded-in inserts 100a (or molded-in inserts 100 or 100b-100h disclosed herein). The ejector pin 186 may be used to push upwardly on the molded or consolidated fiber reinforced thermoplastic composite structure 130 with the one or more molded-in inserts 100a (or molded-in inserts 100 or 100b-100h disclosed herein) to remove it from the mold cavity 182. The one or more pins 190 or fastener devices (not shown) may be removed from the mold cavity 182 leaving the encapsulated or consolidated fiber reinforced thermoplastic composite structure 130 with the one or more molded-in inserts 100a (or molded-in inserts 100 or 100b-100h disclosed herein).

Figure 13A:
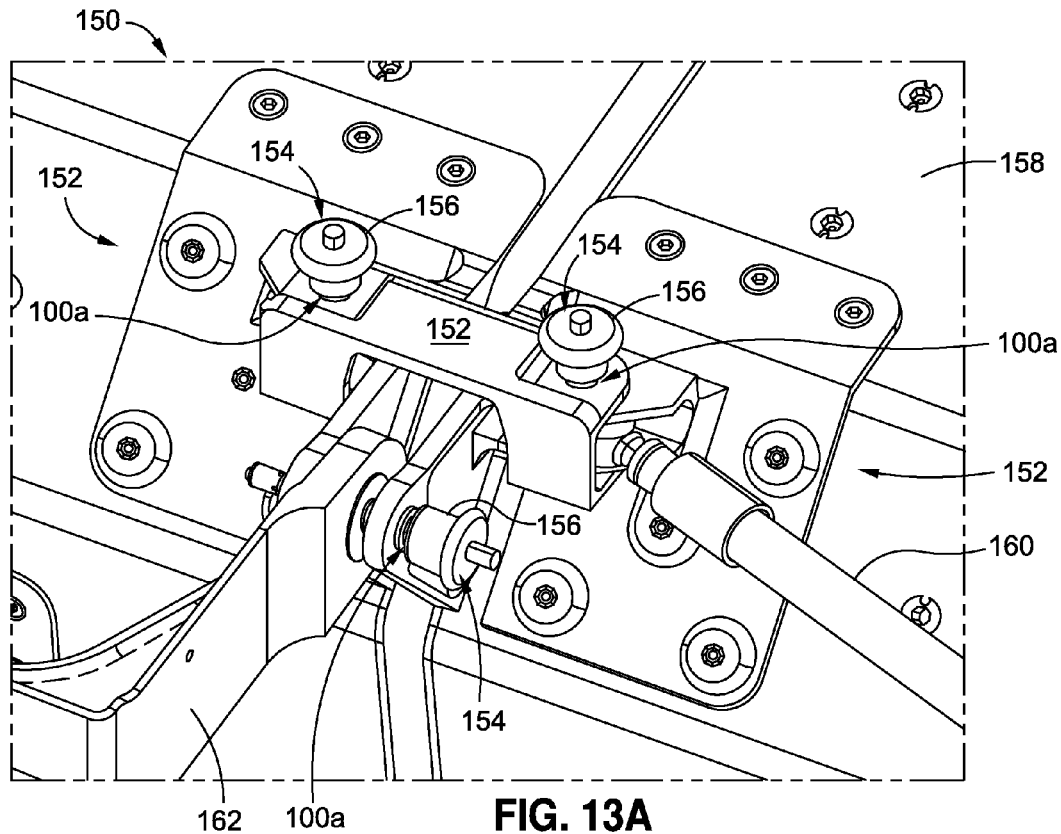
FIG. 13A is an illustration of a top perspective view of one of the embodiments of molded-in inserts of the disclosure molded in place in a fiber reinforced thermoplastic composite pinned joint structure.
Figure 13B:
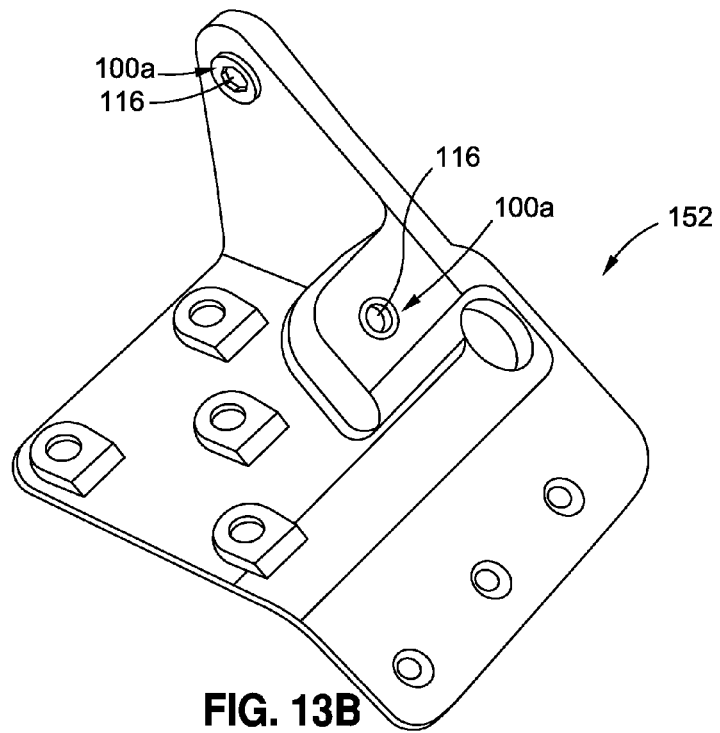
FIG. 13B is an illustration of a side perspective view of a fiber reinforced thermoplastic fitting portion of the fiber reinforced thermoplastic composite pinned joint structure with molded-in inserts of FIG. 13A.

FIG. 13A is an illustration of a top perspective view of one of the embodiments of the molded-in inserts 100a of the disclosure which is molded in place in a fiber reinforced thermoplastic composite pinned joint structure 150 for use in an aircraft 10 (see FIG. 1). FIG. 13B is an illustration of a side perspective view of a fiber reinforced thermoplastic fitting portion 152 of the fiber reinforced thermoplastic composite pinned joint structure 150 with molded-in inserts 100a of FIG. 13A. FIG. 13B shows the molded-in inserts 100a molded in place and shows the central opening 116 of the molded-in inserts 100a designed to received a fastener element 154 (see FIG. 13A), such as a structural pin 156 (see FIG. 13A). As shown in FIG. 13A, the fiber reinforced thermoplastic fitting portions 152 may be attached to a composite panel structure 158, a tie-rod 160, and/or a frame fitting 162.

Figure 19:
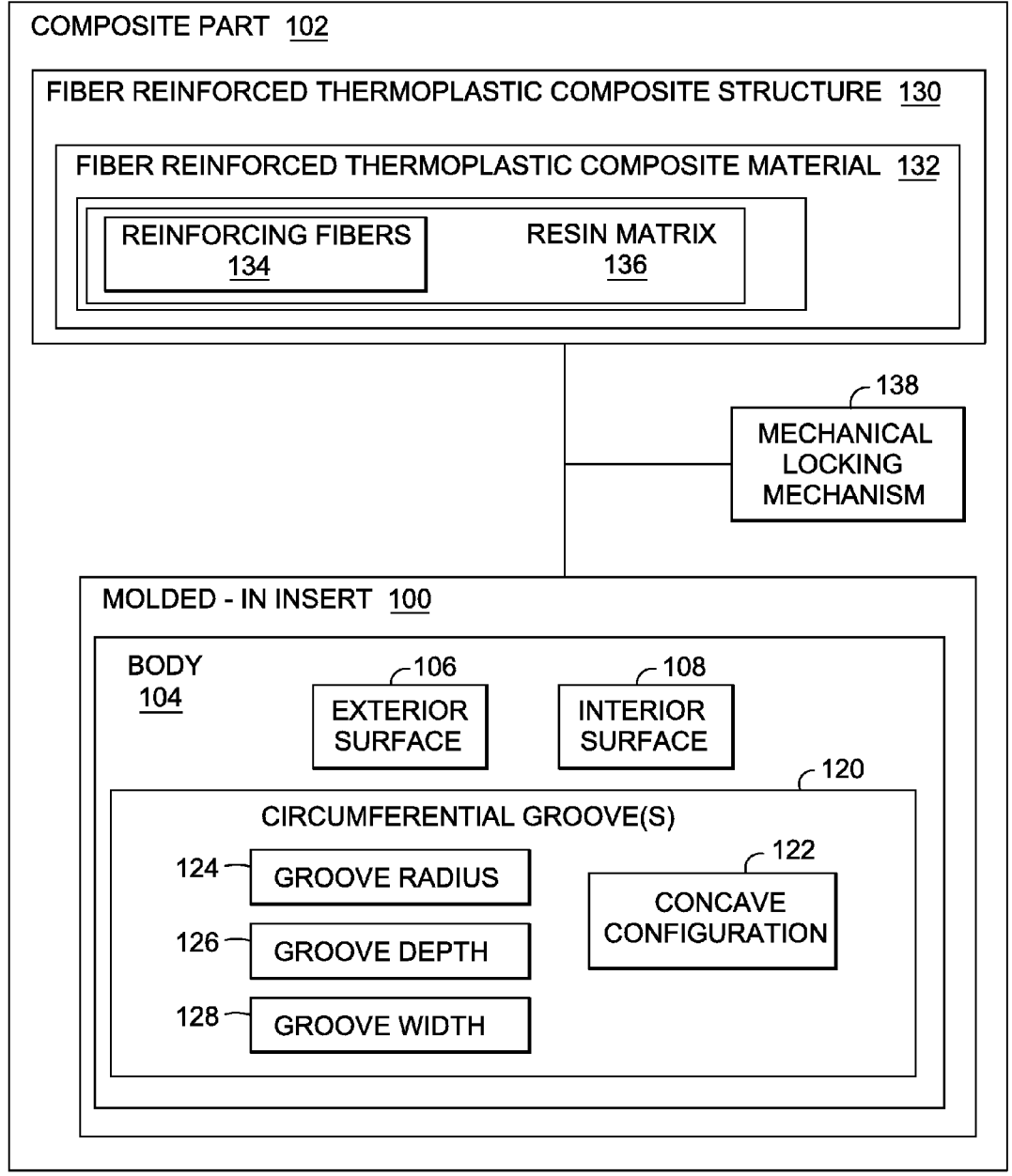
FIG. 19 is an illustration of a functional block diagram of one of the embodiments of a composite part having one of the embodiments of a molded-in insert of the disclosure.

In another embodiment of the disclosure, there is provided a composite part 102 having one of the embodiments of a molded-in insert 100 (or molded-in inserts 100a-100h disclosed herein) of the disclosure. FIG. 19 is an illustration of a functional block diagram of one of the embodiments of the composite part 102 having one of the embodiments of a molded-in insert 100. The composite part 102 may preferably be used in a transport vehicle such as an aircraft 10 (see FIG. 1), an aerospace vehicle, a space launch vehicle, a rocket, a satellite, a rotorcraft, a watercraft, a boat, a train, an automobile, a truck, a bus, or another suitable transport vehicle. As shown in FIG. 19, the composite part 102 comprises a fiber reinforced thermoplastic composite structure 130. The fiber reinforced thermoplastic composite structure 130 comprises fiber reinforced thermoplastic composite material 132 having reinforcing fibers 134 in a resin matrix 136. The composite part 102 further comprises a molded-in insert 100 secured in and to the fiber reinforced thermoplastic composite structure 130. The molded-in insert 100, as discussed in detail above (or molded-in inserts 100a-100h disclosed herein and shown in FIGS. 6-18B), comprises a cylindrical body 104 having an exterior surface 106, an interior surface 108, and at least one circumferential groove 120 formed in the cylindrical body 104. The circumferential groove 120 has a substantially concave configuration 122. The circumferential groove 120 has a groove radius 124, a groove depth 126, and groove width 128. Preferably, the groove radius 124 has a length measurement of 0.025 inch or greater. Preferably, the groove radius 124 is greater in length than or equal to the groove depth 126. Preferably, the groove width 128 is greater in length than the groove depth 126.

Preferably, when the molded-in insert 100 is molded in the fiber reinforced thermoplastic composite structure 130, reinforcing fibers 134 from the fiber reinforced thermoplastic composite material 132 flow into and fully fill the at least one circumferential groove 120 in order to form a high strength mechanical locking mechanism 138 (see FIG. 19) that secures the molded-in insert 100 in place in and to the fiber reinforced thermoplastic composite structure 130. The molded-in insert 100 may be molded in the fiber reinforced thermoplastic composite structure 130 via a molding process comprising compression molding, resin transfer molding, injection molding, blow molding, transfer molding, reaction injection molding, casting, investment casting, or another suitable molding process. As discussed above, the molded-in insert 100 is preferably made of a machinable material. The machinable material may comprise a metal material such as aluminum, stainless steel, titanium, brass, bronze, or another suitable metal material. The machinable material may further comprise a ceramic material, such as alumina, beryllium oxide, silicon carbide, silicon nitride, or another suitable ceramic material. The machinable material may further comprise a composite material such as filled or unfilled epoxy, phenolic, thermoplastic, urethane, polycarbonate, or another suitable composite material.

In one embodiment, as shown in FIG. 6, the at least one circumferential groove 120 may be formed in the exterior surface 106 of the cylindrical body 104. In another embodiment, as shown in FIG. 8, the cylindrical body 104 has two circumferential grooves 120 formed in the exterior surface 106 of the cylindrical body 104. In another embodiment, as shown in FIG. 14, the at least one circumferential groove 120 may be formed in the interior surface 108 of the cylindrical body 104. In another embodiment, as shown in FIGS. 16A-16B, the cylindrical body 104 has two circumferential grooves 120 formed in the interior surface 108 of the cylindrical body 104. In another embodiment, as shown in FIGS. 18A-18B, the cylindrical body 104 may have a first circumferential groove 120a formed in the exterior surface 106 of the cylindrical body 104 and a second circumferential groove 120b formed in the interior surface 108 of the cylindrical body 104.

Figure 20:
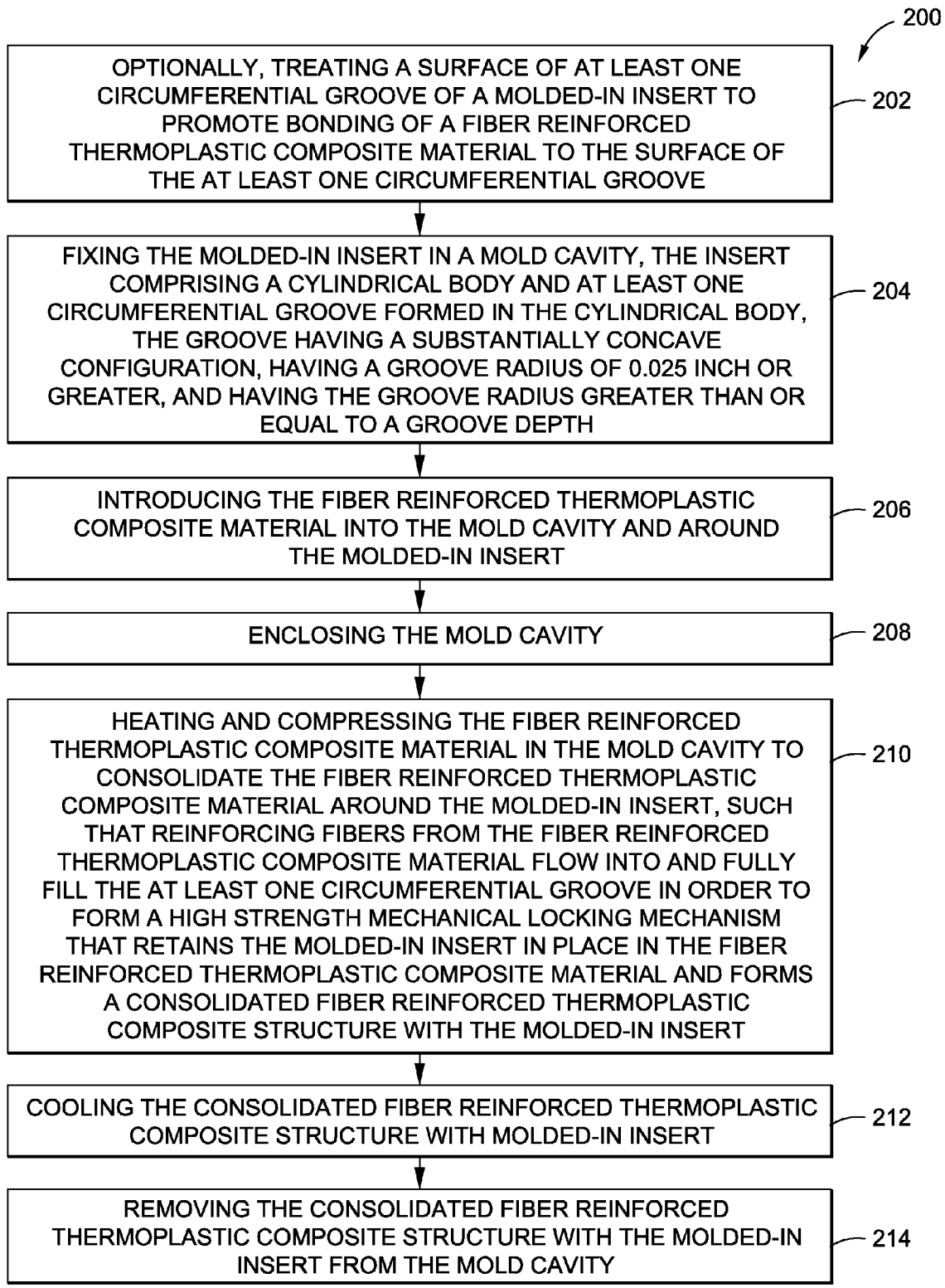
FIG. 20 is a flow diagram illustrating an exemplary embodiment of a method of the disclosure.

In another embodiment of the disclosure, there is provided a method 200 of retaining a molded-in insert 100, or one of the embodiments of the molded-in insert 100a-100h disclosed herein, in a fiber reinforced thermoplastic composite material 132 and forming a high strength mechanical locking mechanism 138 to secure the molded-in insert 100 (or molded-in inserts 100 or 100b-100h disclosed herein) in a fiber reinforced thermoplastic composite structure 130. FIG. 20 is a flow diagram illustrating an exemplary embodiment of the method 200 of the disclosure. The method 200 may initially comprise optional step 202 of treating a surface 170 (see FIGS. 6, 8) of at least one circumferential groove 120 of a molded-in insert 100 (or molded-in inserts 100 or 100b-100h disclosed herein), to promote bonding of the fiber reinforced thermoplastic composite material 132 (see FIG. 11) to the surface 170 of the at least one circumferential groove 120. The treating of the surface 170 of the circumferential groove 120 may comprise one or more surface preparation treatments such as solvent wiping, abrading, grit blasting, sanding, sandblasting, chemical cleaning, chemical etching, sol gel treatment, primer treatment, adhesive treatment, or another suitable surface preparation treatment.

The method 200 further comprises step 204 of fixing the molded-in insert 100 (or molded-in inserts 100 or 100b-100h disclosed herein) in a mold cavity 182 (see FIG. 21A), such as for example, a mold cavity 182 of a split mold apparatus 172 (see FIG. 21A). As discussed above, the molded-in insert 100 (or molded-in inserts 100 or 100b-100h disclosed herein) comprises a cylindrical body 104 (see, for example, FIGS. 6-8 and 14-19). The cylindrical body 104 has exterior surface 106, interior surface 108, first end 112, and second end 114 (see, for example, FIGS. 6-8). The cylindrical body 104 further comprises first circumferential substantially flat surface 110a at the second end 114 and second circumferential substantially flat surface 110b at the first end 112 (see FIGS. 6-7), and may further comprise third circumferential substantially flat surface 110c (see FIG. 8). The molded-in insert 100 (or molded-in inserts 100 or 100b-100h disclosed herein) may further comprise central opening 116 for receiving a fastener element 154 (see FIG. 13A), such as structural pin 156 (see FIG. 13A), or may have a solid interior 148 (see FIG. 17).

The molded-in insert 100 (or molded-in inserts 100 or 100b-100h disclosed herein) further comprises at least one circumferential groove 120 (see, for example, FIGS. 6-8 and 14-19) formed in the cylindrical body 104. The circumferential groove 120 preferably has a substantially concave configuration 122 (see, for example, FIGS. 6-8 and 14-19). As shown in FIG. 9, the circumferential groove 120 has a groove radius 124, a groove depth 126, and groove width 128. Preferably, the groove radius 124 has a length measurement of 0.025 inch or greater. Preferably, the groove radius 124 is greater in length than or equal to the groove depth 126. Preferably, the groove width 128 is greater in length than the groove depth 126. In one embodiment, as shown in FIG. 6, the at least one circumferential groove 120 may be formed in the exterior surface 106 of the cylindrical body 104. In another embodiment, as shown in FIG. 8, the cylindrical body 104 has two circumferential grooves 120 formed in the exterior surface 106 of the cylindrical body 104. In another embodiment, as shown in FIG. 14, the at least one circumferential groove 120 may be formed in the interior surface 108 of the cylindrical body 104. In another embodiment, as shown in FIGS. 16A-16B, the cylindrical body 104 has two circumferential grooves 120 formed in the interior surface 108 of the cylindrical body 104. In another embodiment, as shown in FIGS. 18A-18B, the cylindrical body 104 may have a first circumferential groove 120a formed in the exterior surface 106 of the cylindrical body 104 and a second circumferential groove 120b formed in the interior surface 108 of the cylindrical body 104.

The method 200 further comprises step 206 of introducing the fiber reinforced thermoplastic composite material 132 (see FIG. 11) into the mold cavity 182 and around the molded-in insert 100 (or molded-in inserts 100 or 100b-100h disclosed herein). The method 200 further comprises step 208 of enclosing the mold cavity 182 (see FIGS. 21A-21B). The method 200 further comprises step 210 of heating via a heat source 192 (see FIGS. 21A-21C) and compressing, for example, via a hydraulic ram element 180 (see FIGS. 21A-21C), the fiber reinforced thermoplastic composite material 132 in the mold cavity 182 to consolidate the fiber reinforced thermoplastic composite material 132 around the molded-in insert 100 (or molded-in inserts 100 or 100b-100h disclosed herein), such that reinforcing fibers 134 from the fiber reinforced thermoplastic composite material 132 flow into and fully fill the at least one circumferential groove 120 in order to form a high strength mechanical locking mechanism 138 (see FIG. 11) that retains the molded-in insert 100, or one of the embodiments 100a-100h, in place in the fiber reinforced thermoplastic composite material 132 and in order to form a consolidated fiber reinforced thermoplastic composite structure 130 with the molded-in insert 100 (or molded-in inserts 100 or 100b-100h disclosed herein).

The method 200 further comprises step 212 of cooling the consolidated fiber reinforced thermoplastic composite material 132 with molded-in insert 100 (or molded-in inserts 100 or 100b-100h disclosed herein). The cooling step 212 may be conducted via forced convection, or alternatively, with any suitable active cooling process such as from a cooling source 198 (see FIGS. 21A-21C) which may be connected to heating/cooling channels 194 (see FIGS. 21A-21C) such as formed in a mold cavity 182 (see FIGS. 21A-21C). The molded-in insert 100 (or molded-in inserts 100 or 100b-100h disclosed herein) is preferably consolidated with the fiber reinforced thermoplastic composite structure 130 via a molding process comprising compression molding, resin transfer molding, injection molding, blow molding, transfer molding, reaction injection molding, casting, investment casting, or another suitable molding process. The method 200 further comprises step 214 of removing the consolidated fiber reinforced thermoplastic composite material 132 with molded-in insert 100 (or molded-in inserts 100 or 100b-100h disclosed herein) from the mold cavity 182 of the split mold apparatus 172 (see FIG. 21C).

Figure 3:
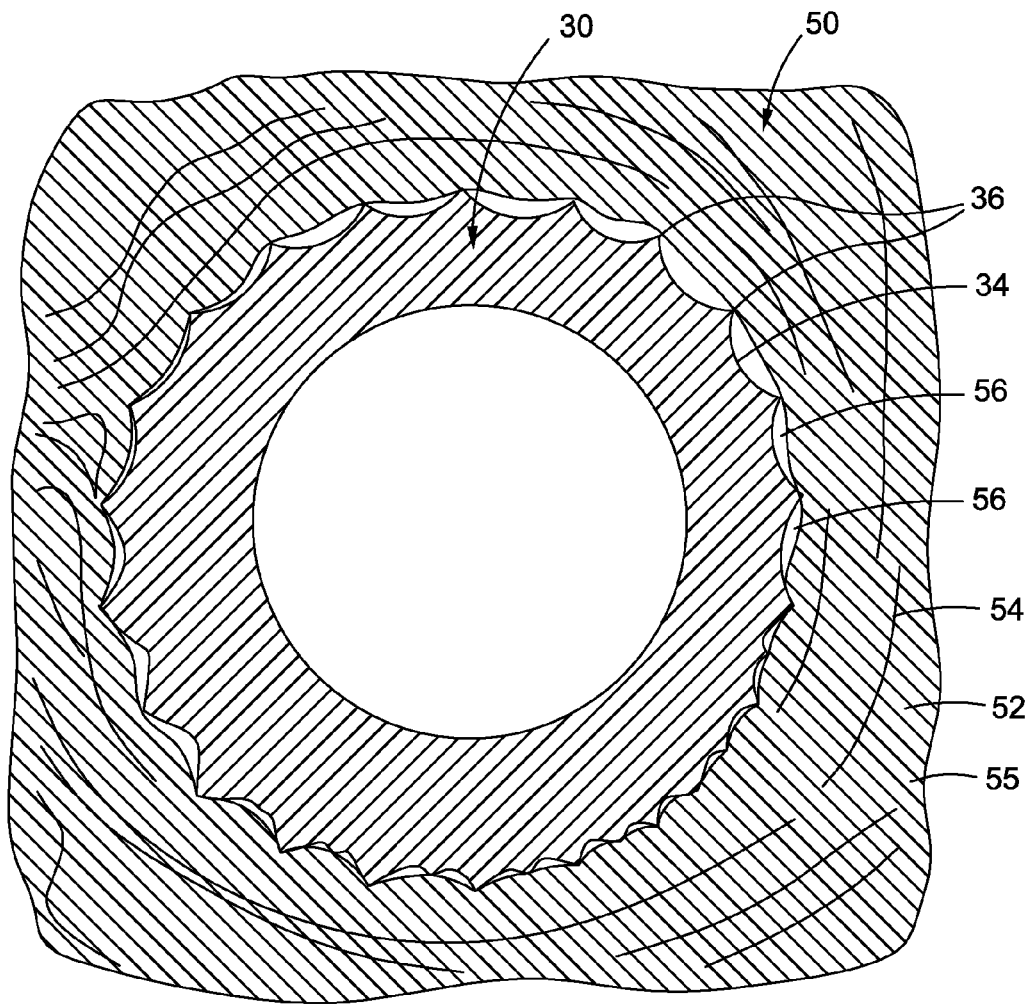
FIG. 3 is an illustration of a cross-sectional top view of a known molded-in insert with a knurled surface after being compression molded in place in a carbon fiber reinforced thermoplastic composite part.
Figure 4:
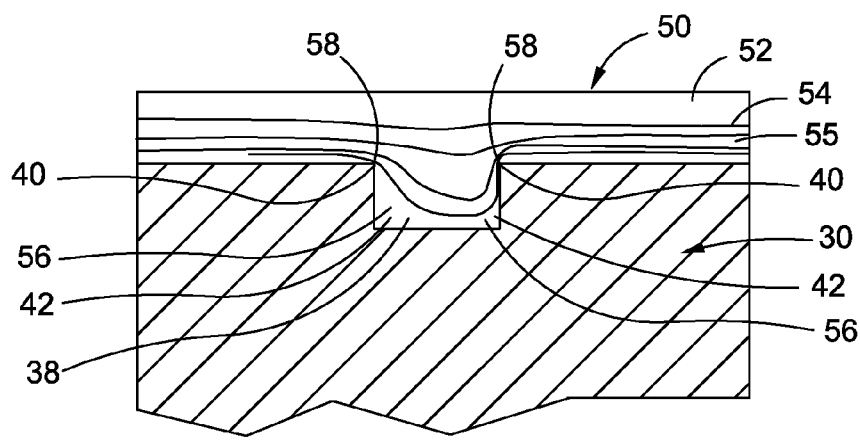
FIG. 4 is an illustration of a cross-sectional side view of a known molded-in insert having a groove with sharp edges and sharp internal corners molded in place in a carbon fiber reinforced thermoplastic composite part.
Figure 5A:
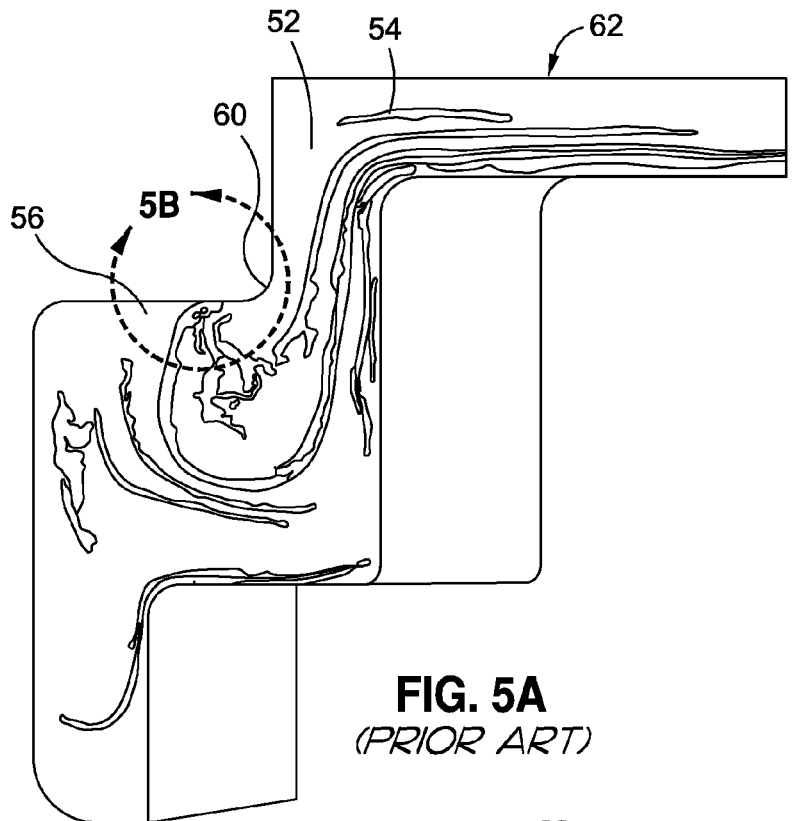
FIG. 5A is an illustration of a cross-sectional side view showing void areas of incomplete consolidation.
Figure 5B:
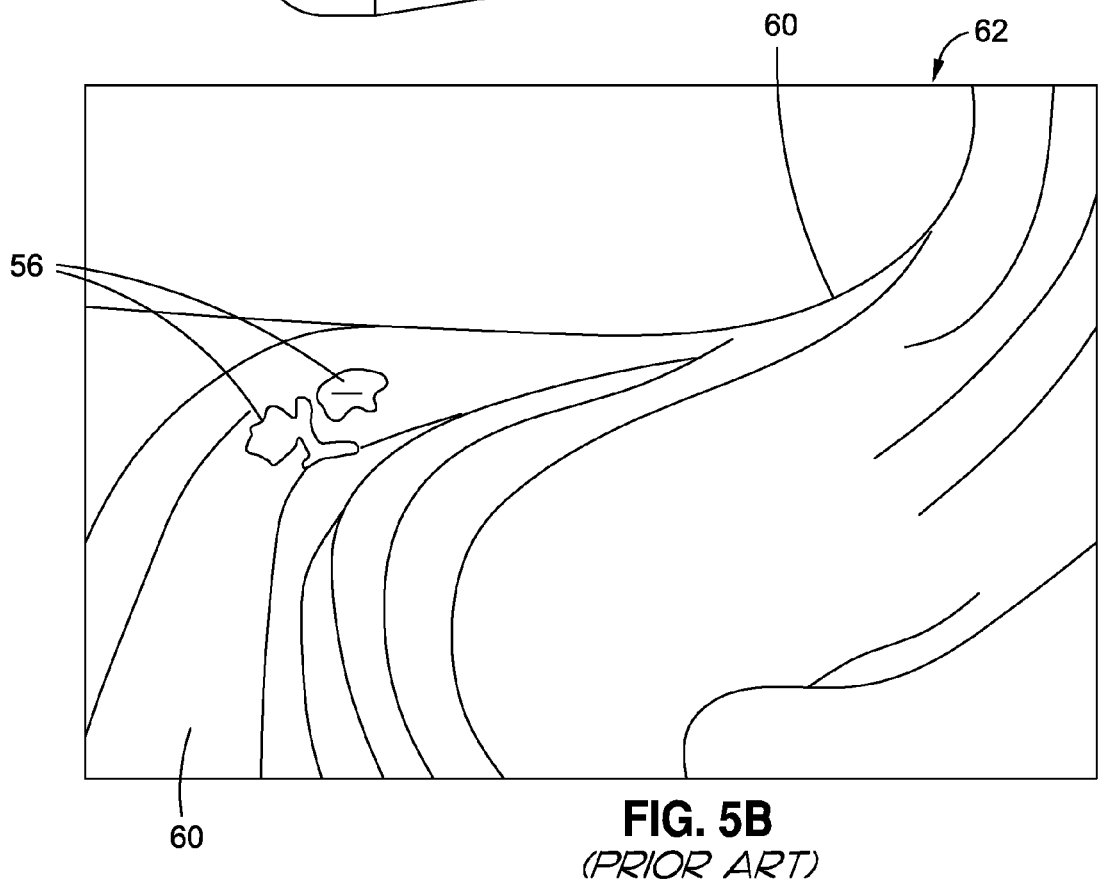
FIG. 5B is an illustration of a close-up view of the circled portion 5B of FIG. 5A showing the void areas of incomplete consolidation.

Preferably, the method 200 minimizes or eliminates formation of void areas 56 (see FIGS. 3, 4) of incomplete consolidation where there is no or minimal reinforcement. In addition, preferably, the method 200 minimizes or eliminates the severing or cutting of any of the reinforcing fibers 134 in the fiber reinforced thermoplastic composite material 132 by sharp edges 40 (see FIG. 4).

Disclosed embodiments of the molded-in insert 100 or 100a-100h and method 200 provide molded-in inserts having at least one relatively shallow, circumferential groove 120 (see FIGS. 6-8 and 14-18B) for molding in place within or to fiber reinforced thermoplastic composite structures 130 (see FIG. 10) preferably used in composite parts 102 (see FIG. 1). In addition, disclosed embodiments of the molded-in inserts 100 or 100a-100h and method 200 provide molded-in inserts having at least one relatively shallow, circumferential groove 120 and having a relatively large open volume which allow the reinforcing fibers 134 to enter the circumferential groove 120 and completely or substantially fill the circumferential groove 120 and to form a high strength mechanical locking mechanism 138 (see FIG. 11) during the molding process. Such high strength mechanical locking mechanism 138 retains or captures the molded-in insert 100 or 100a-100h in the fiber reinforced thermoplastic composite structure 130 in such a way as to develop the full strength of the surrounding fiber reinforced thermoplastic composite material 132 and not just the strength of the resin matrix 136.

Disclosed embodiments of the molded-in inserts 100 or 100a-100h and method 200 may provide full capture strength of the molded-in inserts 100 or 100a-100h within the fiber reinforced thermoplastic composite structure 130, may eliminate or minimize the formation of void areas 56 (see FIGS. 3, 4) of incomplete consolidation, and may eliminate or minimize the cutting of the reinforcing fibers 134 in the resin matrix 136 by sharp edges 40 (see FIG. 4) which may reduce capture strength. Further, disclosed embodiments of the molded-in inserts 100 or 100a-100h and method 200 may be used to receive mating fasteners, provide robust attachment points for multi-part assemblies, provide load transfer points, avoid the costs of known post-molding insert or fitting installation methods, such as bonding in place, drilling and tapping, or other mechanical capture methods that utilize press-fit inserts or swaged inserts, and reduce final part costs compared to known post-molding insert or fitting installation methods which may add, for example, additional set-up and operating time or adhesive application and drying time.

Many modifications and other embodiments of the disclosure will come to mind to one skilled in the art to which this disclosure pertains having the benefit of the teachings presented in the foregoing descriptions and the associated drawings. The embodiments described herein are meant to be illustrative and are not intended to be limiting or exhaustive. Although specific terms are employed herein, they are used in a generic and descriptive sense only and not for purposes of limitation.

What is claimed is:

1. A molded-in insert for high strength retention in a fiber reinforced thermoplastic composite structure, the molded-in insert comprising:

a cylindrical body having first and second circumferential substantially flat surfaces of identical width and diameter; and, at least one circumferential groove extending between the first and second circumferential substantially flat surfaces formed in the cylindrical body to obtain the molded-in insert, the groove having a substantially concave configuration, having a groove radius of 0.025 inch or greater, where the groove radius is constant, and having the groove radius greater than or equal to a groove depth and having a groove width greater than the groove depth, wherein the groove is configured to be filled with fiber reinforced thermoplastic composite material and is configured to mold in place within or to the fiber reinforced thermoplastic composite structure.

2. The insert of claim 1, wherein when the molded-in insert is molded in the fiber reinforced thermoplastic composite structure, reinforcing fibers from the fiber reinforced thermoplastic composite structure flow into and fully fill the at least one circumferential groove in order to form a high strength mechanical locking mechanism that secures the molded-in insert in place in the fiber reinforced thermoplastic composite structure.

3. The insert of claim 2, wherein the molded-in insert is molded in the fiber reinforced thermoplastic composite structure via a molding process selected from a group comprising compression molding, resin transfer molding, injection molding, blow molding, transfer molding, reaction injection molding, casting, and investment casting.

4. The insert of claim 1, wherein the at least one circumferential groove is formed in an exterior surface of the cylindrical body.

5. The insert of claim 1, wherein the at least one circumferential groove is formed in an interior surface of the cylindrical body.

6. The insert of claim 1, wherein the cylindrical body has two or more circumferential grooves formed in an exterior surface of the cylindrical body.

7. The insert of claim 1, wherein the cylindrical body has two or more circumferential grooves formed in an interior surface of the cylindrical body.

8. The insert of claim 1, wherein the cylindrical body has a first circumferential groove formed in an exterior surface of the cylindrical body and a second circumferential groove formed in an interior surface of the cylindrical body.

9. The insert of claim 1, wherein the molded-in insert is made of a machinable material selected from a group comprising a metal material, a ceramic material, and a composite material.

10. The insert of claim 3, wherein the at least one circumferential groove is formed in an exterior surface of the cylindrical body.

11. The insert of claim 3, wherein the at least one circumferential groove is formed in an interior surface of the cylindrical body.

12. The insert of claim 3, wherein the cylindrical body has two or more circumferential grooves formed in an exterior surface of the cylindrical body.

13. The insert of claim 3, wherein the cylindrical body has two or more circumferential grooves formed in an interior surface of the cylindrical body.

14. The insert of claim 3, wherein the cylindrical body has a first circumferential groove formed in an exterior surface of the cylindrical body and a second circumferential groove formed in an interior surface of the cylindrical body.

15. The insert of claim 3, wherein the molded-in insert is made of a machinable material selected from a group comprising a metal material, a ceramic material, and a composite material.

16. The insert of claim 9, wherein the at least one circumferential groove is formed in an exterior surface of the cylindrical body.

17. The insert of claim 9, wherein the at least one circumferential groove is formed in an interior surface of the cylindrical body.

18. The insert of claim 9, wherein the cylindrical body has two or more circumferential grooves formed in an exterior surface of the cylindrical body.

19. The insert of claim 9, wherein the cylindrical body has two or more circumferential grooves formed in an interior surface of the cylindrical body.

20. The insert of claim 9, wherein the cylindrical body has a first circumferential groove formed in an exterior surface of the cylindrical body and a second circumferential groove formed in an interior surface of the cylindrical body.

* * * * *